US010559292B2

(12) United States Patent
Goto et al.

(10) Patent No.: US 10,559,292 B2
(45) Date of Patent: Feb. 11, 2020

(54) ROTOR BLADE NOISE REDUCTION SYSTEM, FLYING OBJECT AND NOISE REDUCTION SYSTEM

(71) Applicant: KABUSHIKI KAISHA TOSHIBA, Tokyo (JP)

(72) Inventors: Tatsuhiko Goto, Kanagawa (JP); Akihiko Enamito, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 16/111,663

(22) Filed: Aug. 24, 2018

(65) Prior Publication Data
US 2019/0295523 A1 Sep. 26, 2019

(30) Foreign Application Priority Data

Mar. 20, 2018 (JP) ................. 2018-053453

(51) Int. Cl.
*G10K 11/178* (2006.01)
*F04D 19/00* (2006.01)
(Continued)

(52) U.S. Cl.
CPC ........ *G10K 11/17823* (2018.01); *B64C 11/00* (2013.01); *F04D 19/002* (2013.01);
(Continued)

(58) Field of Classification Search
USPC ... 381/71, 71.1, 71.5, 71.7, 71.8, 71.14, 190
See application file for complete search history.

(56) References Cited

U.S. PATENT DOCUMENTS 5,382,134 A 1/1995 Pla et al.
5,478,199 A 12/1995 Gliebe
(Continued)

FOREIGN PATENT DOCUMENTS

JP H1-159406 A 6/1989
JP H1-128000 U 8/1989
(Continued)

OTHER PUBLICATIONS

Y. Honda, et al., "Active Minimization of Blade Rotational Noise from an Axial Fan," Transactions of Japan Society of Mechanical Engineers (Part C), vol. 59, pp. 228-233 (1993).
(Continued)

*Primary Examiner* — Yosef K Laekemariam
(74) *Attorney, Agent, or Firm* — Finnegan, Henderson, Farabow, Garrett & Dunner, L.L.P.

(57) ABSTRACT

A rotor blade noise reduction system includes: a plurality of rotor blades; a plurality of first speakers disposed equidistantly on a first circumference which is opposed to one surface of a rotor blade plane; a plurality of second speakers disposed equidistantly on a second circumference which is opposed to the other surface of the rotor blade plane; at least one evaluation microphone configured to acquire noise generated from the rotating rotor blades and control sound generated from the first speakers and the second speakers; and an active sound suppression processor configured to input a plurality of first delay control signals corresponding to the first speakers, and to input a plurality of second delay control signals corresponding to the second speakers.

13 Claims, 24 Drawing Sheets

(51) Int. Cl.
*F04D 29/66* (2006.01)
*B64C 11/00* (2006.01)

(52) U.S. Cl.
CPC ........ *F04D 29/665* (2013.01); *B64C 2220/00* (2013.01); *G10K 2210/1281* (2013.01); *G10K 2210/3012* (2013.01); *G10K 2210/3046* (2013.01)

(56) References Cited

U.S. PATENT DOCUMENTS

| | | | |
|---|---|---|---|
| 5,515,444 A * | 5/1996 | Burdisso | G10K 11/178 381/71.5 |
| 5,526,432 A | 6/1996 | Denenberg | |
| 6,201,872 B1 | 3/2001 | Hersh et al. | |
| 2018/0204561 A1 | 7/2018 | Goto et al. | |
| 2019/0088244 A1* | 3/2019 | Goto | G10K 11/178 |

FOREIGN PATENT DOCUMENTS

| | | |
|---|---|---|
| JP | H7-134590 A | 5/1995 |
| JP | H9-511810 A | 11/1997 |
| JP | H11-502032 A | 2/1999 |
| JP | 2003-233133 A | 8/2003 |
| JP | 2006-2111770 | 8/2006 |
| JP | 2018-111461 A | 7/2018 |
| JP | 2019-53197 A | 4/2019 |

OTHER PUBLICATIONS

T. Aoki, et al., "Theoretical study on active control of rotational noise source using discrete ring sound source," Japan Acoustical Society Journal, vol. 60, No. 11, pp. 639-645 (2004).

* cited by examiner

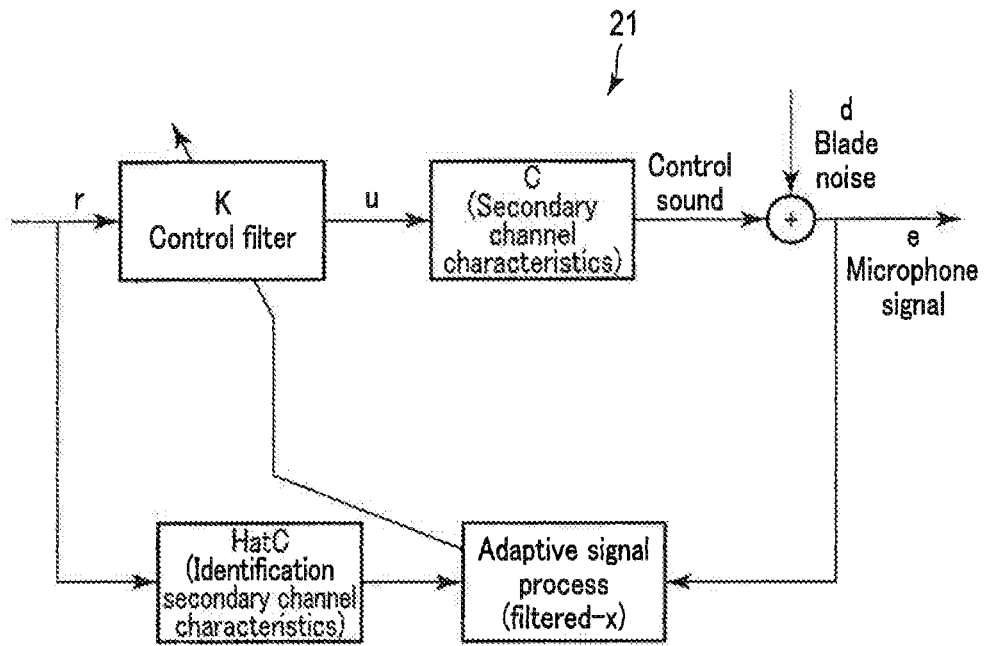
F I G. 5
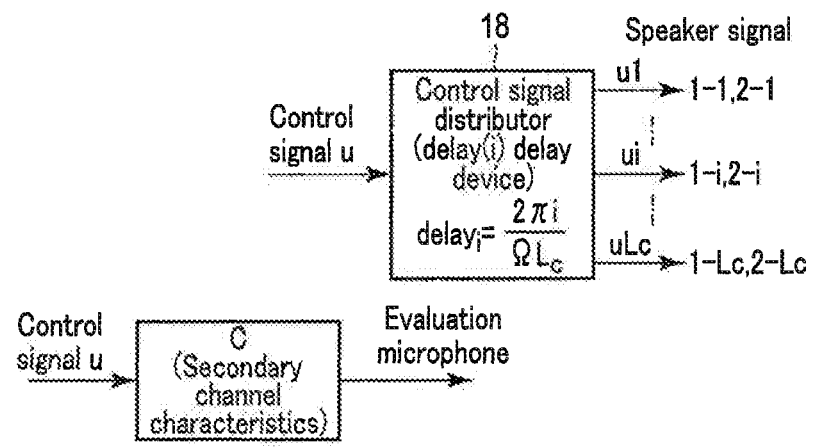
F I G. 6

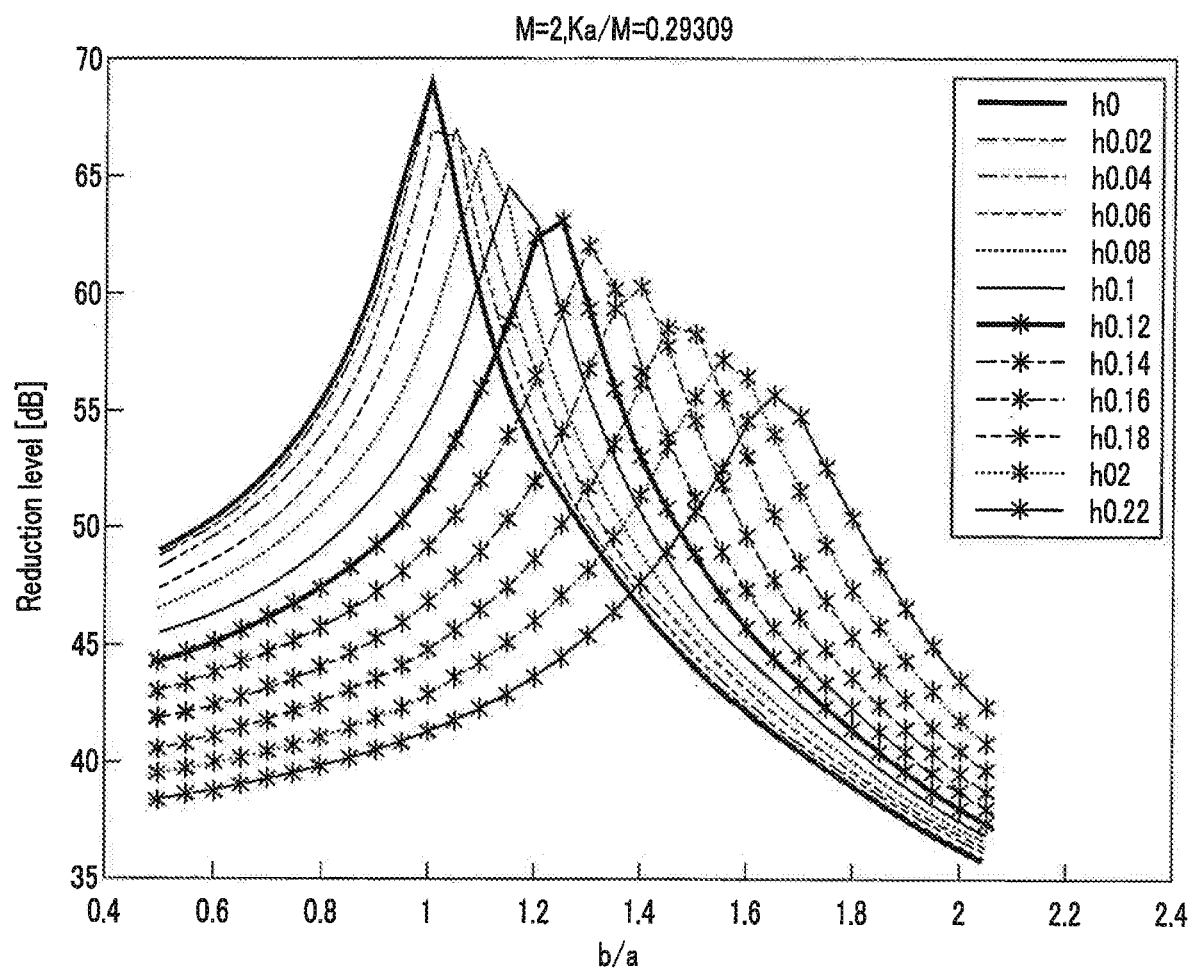
F I G. 7

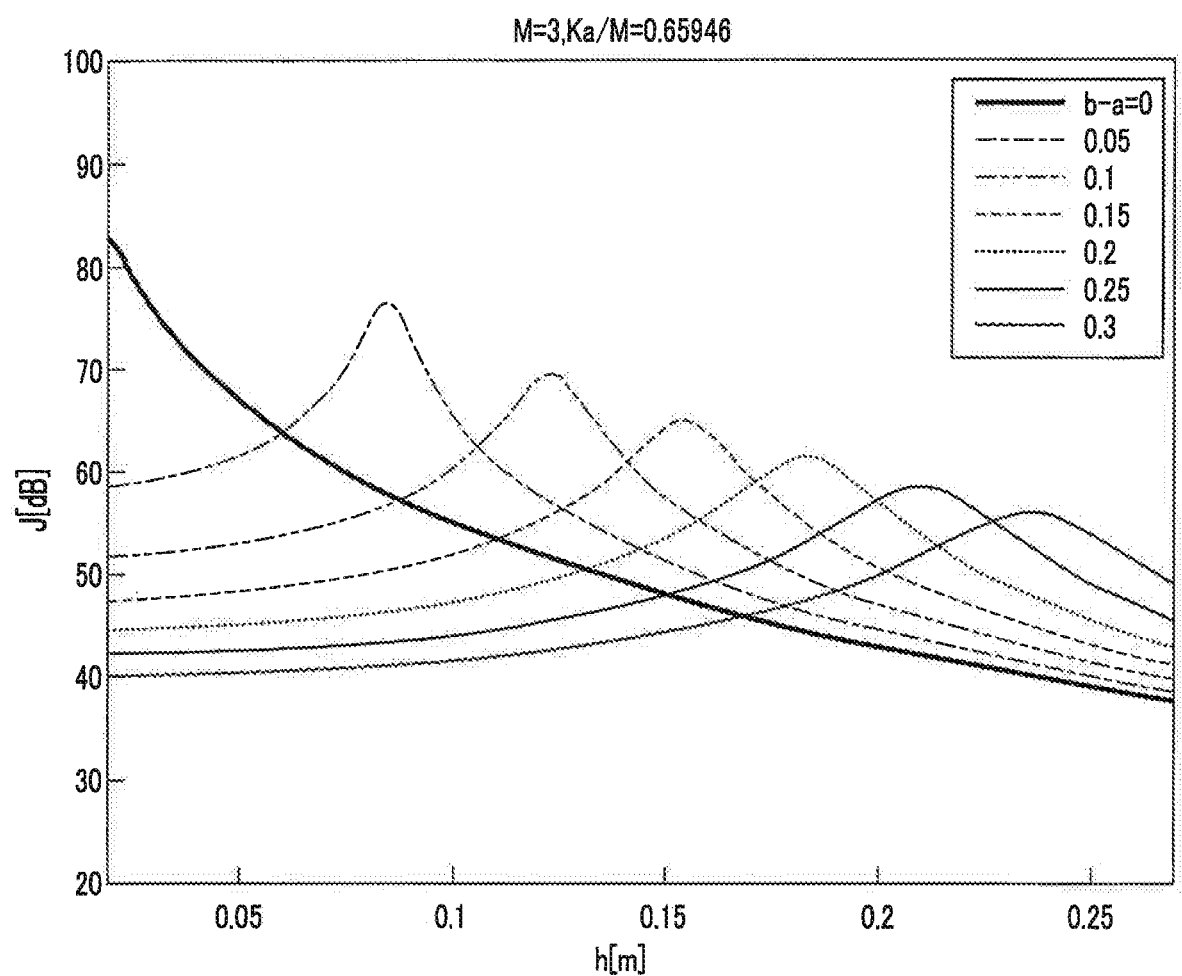
F I G. 10

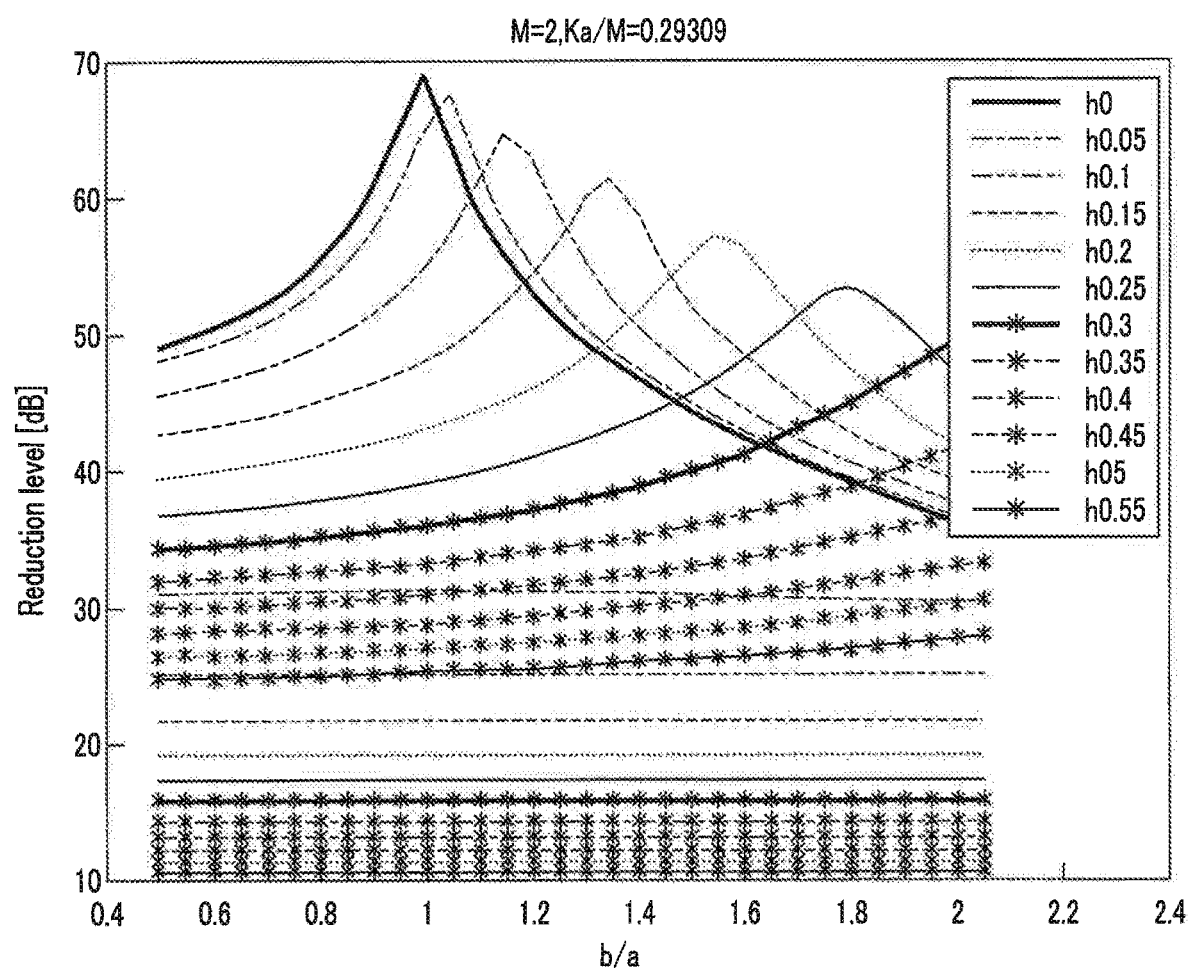
F I G. 14

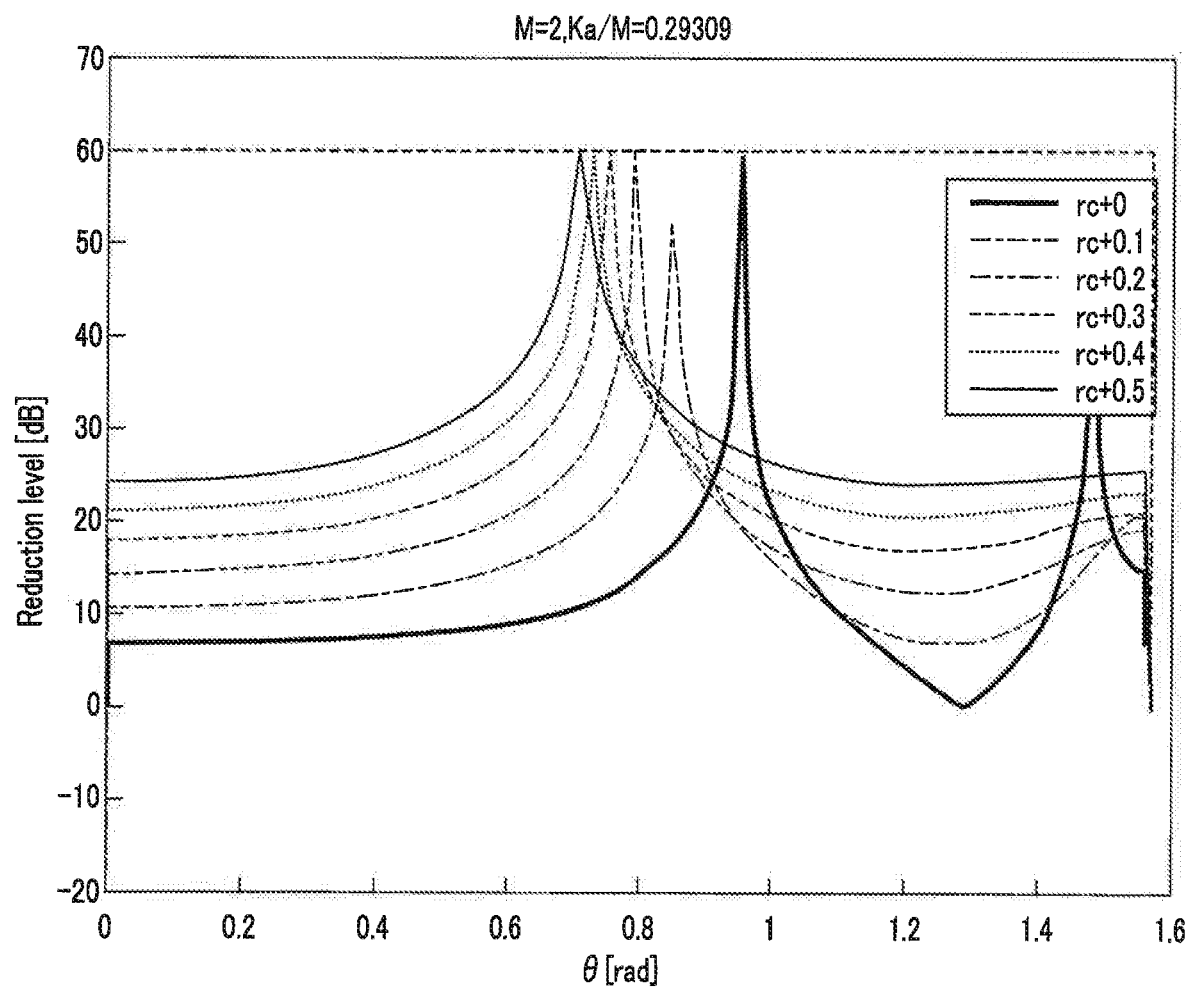
F I G. 16

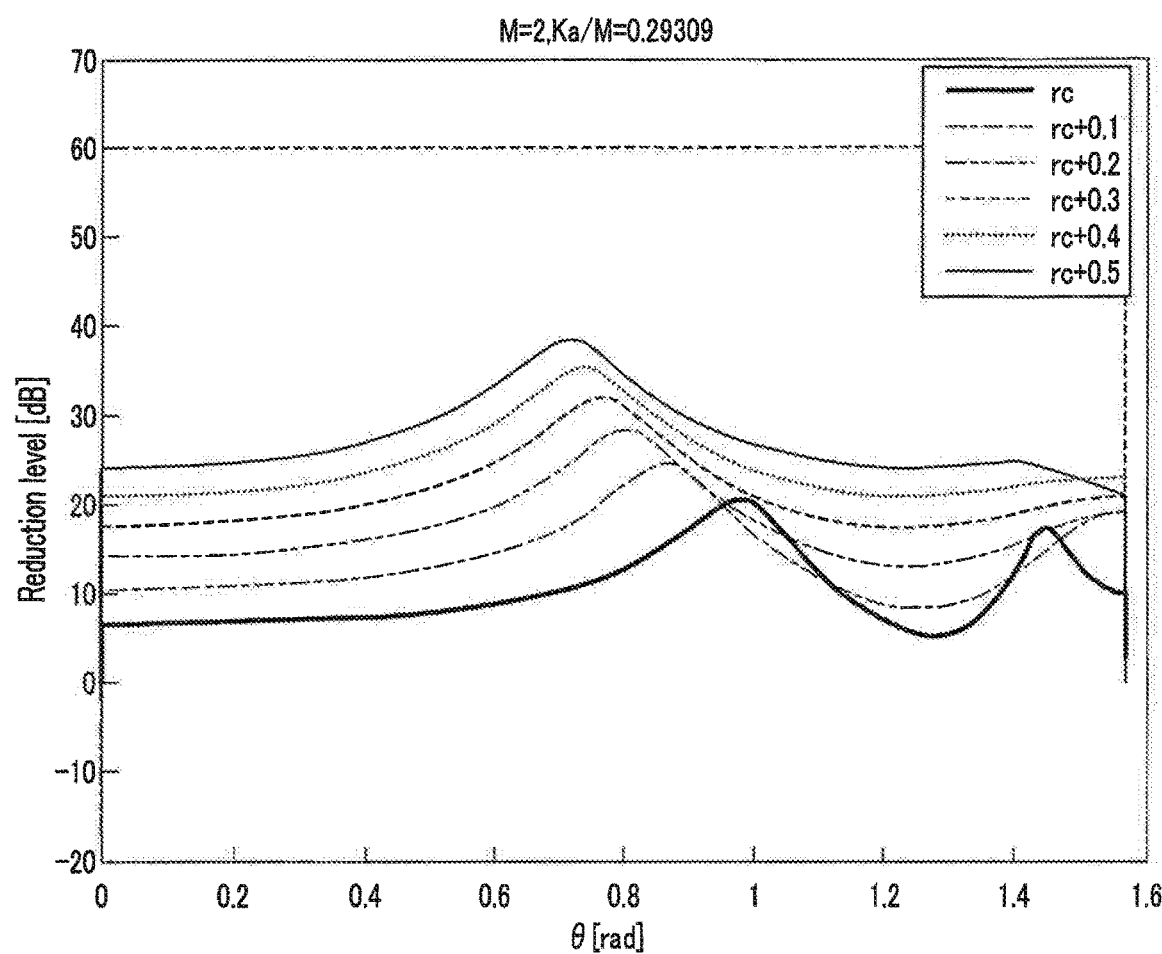
F I G. 20

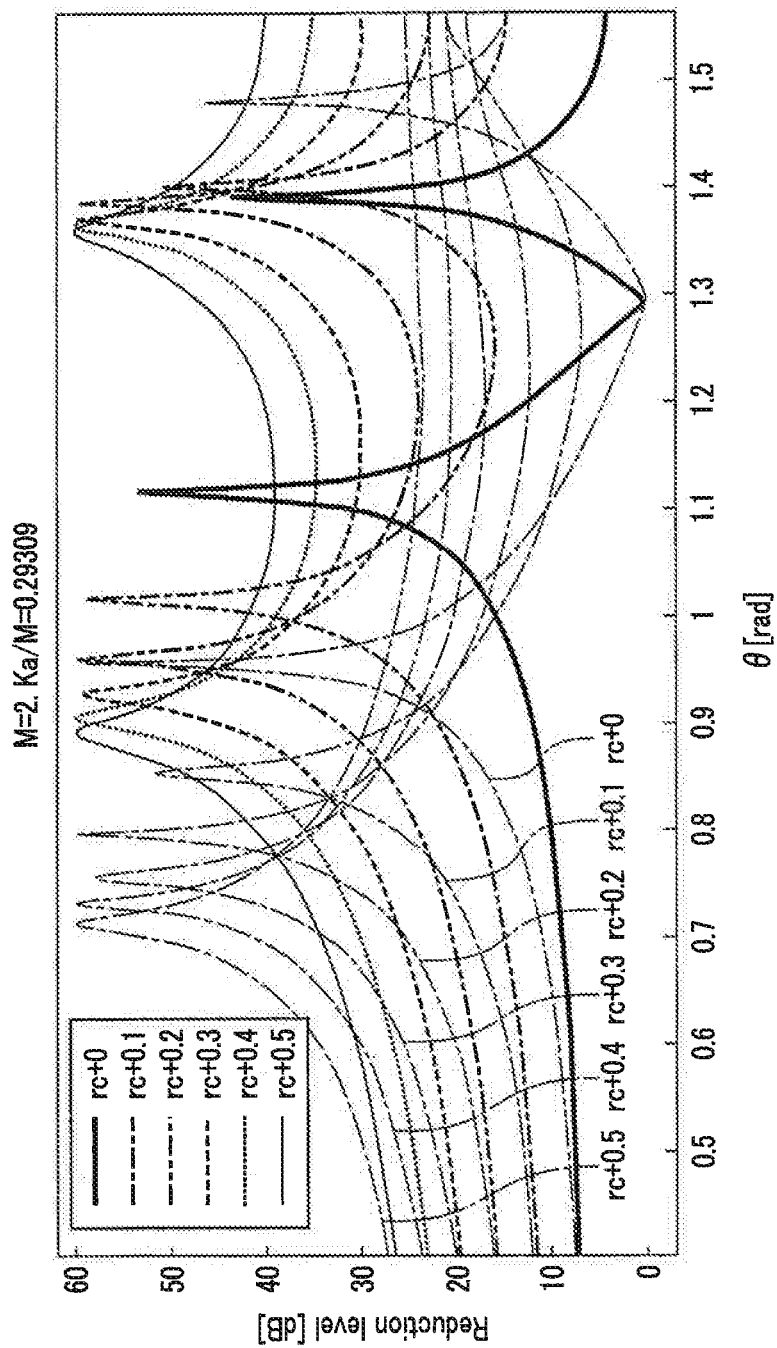
F I G. 23

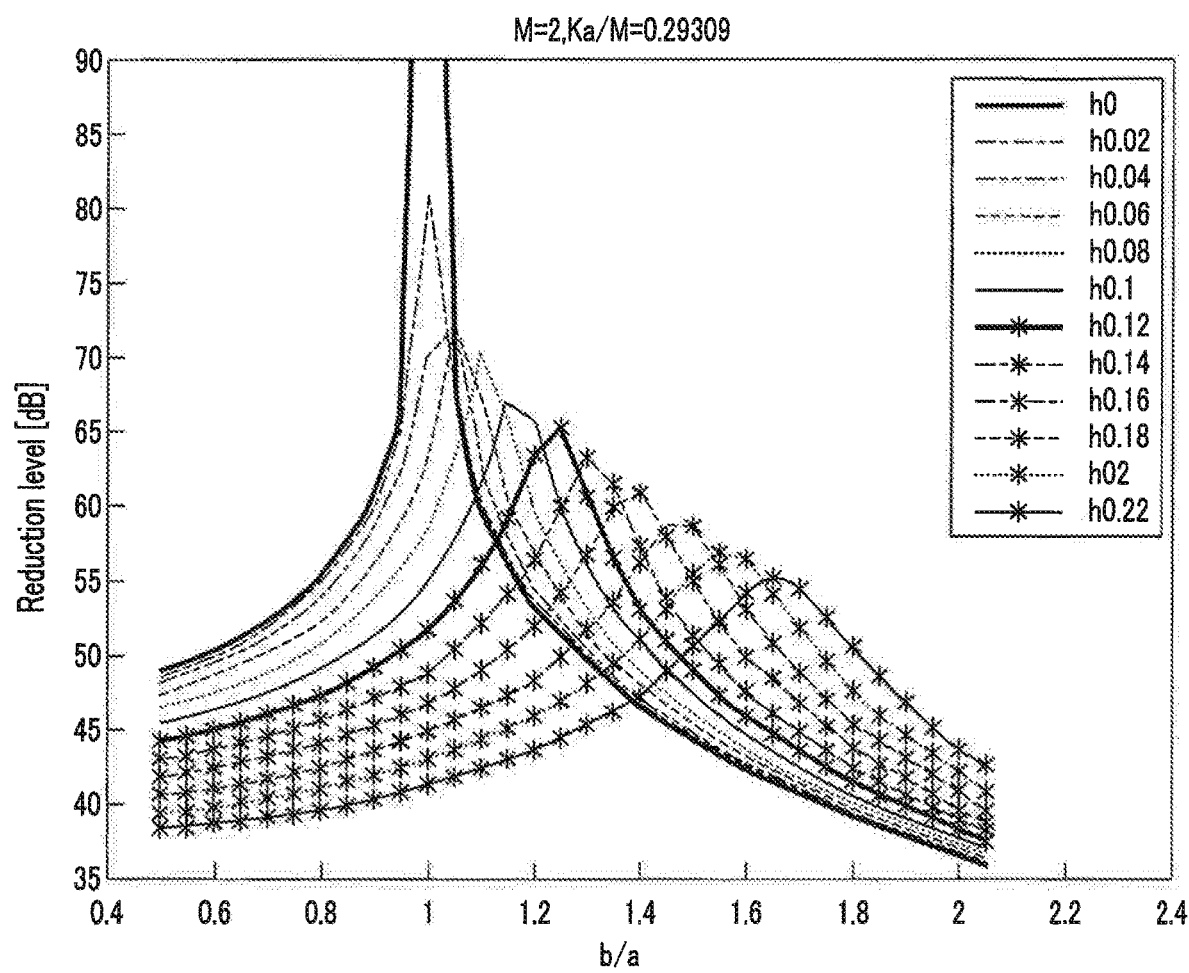
F I G. 28

ROTOR BLADE NOISE REDUCTION SYSTEM, FLYING OBJECT AND NOISE REDUCTION SYSTEM

CROSS-REFERENCE TO RELATED APPLICATIONS

This application is based upon and claims the benefit of priority from prior Japanese Patent Application No. 2018-053453, filed Mar. 20, 2018, the entire contents of which are incorporated herein by reference.

FIELD

Embodiments of the present invention relate to a rotor blade noise reduction system which can reduce rotor blade noise.

BACKGROUND

As a method for reducing noise of a rotor blade, active sound suppression control (active noise control, also referred to as "ANC") is known. The ANC can reduce noise by outputting from a control speaker a signal (control sound) having the same amplitude as, and having an opposite phase to, the noise.

BRIEF DESCRIPTION OF THE DRAWINGS

FIG. 5 is a block diagram illustrating a configuration of an ANC algorithm of a feed-forward type using a filtered-x of the rotor blade noise reduction system of the first embodiment.

FIG. 6 is a block diagram illustrating a distributor/delay device for distributing control signals from the ANC algorithm configuration illustrated in FIG. 4 or FIG. 5 to a plurality of first speakers and a plurality of second speakers illustrated in FIG. 3.

FIG. 7 is a graph illustrating a reduction level of acoustic power of Example 1 of the first embodiment.

FIG. 10 is a graph illustrating a plot of an evaluation function J in Example 1_2 of the first embodiment.

FIG. 14 is a graph illustrating a reduction level of acoustic power of Example 4 of the first embodiment.

FIG. 16 is a graph illustrating a reduction level of acoustic power of Example 5 of the first embodiment.

FIG. 20 is a graph illustrating a reduction level of acoustic power of the comparative example.

FIG. 23 is a graph illustrating a reduction level of acoustic power of Example 6.

FIG. 28 is a graph illustrating a reduction level of acoustic power of Example 8 of the second embodiment.

DETAILED DESCRIPTION

According to one embodiment, a rotor blade noise reduction system includes: a plurality of rotor blades configured to be rotatable about a rotational axis; a plurality of first speakers disposed equidistantly on a first circumference which is opposed to one surface of a rotor blade plane defined by the rotor blades rotating about the rotational axis; a plurality of second speakers disposed equidistantly on a second circumference which is opposed to the other surface of the rotor blade plane; at least one evaluation microphone configured to acquire noise generated from the rotating rotor blades and control sound generated from the first speakers and the second speakers; and an active sound suppression processor configured to input a plurality of first delay control signals corresponding to the first speakers, and to input a plurality of second delay control signals corresponding to the second speakers.

To begin with, a rotor blade rotation model of an axial-flow fan, which is a multiple sound source, will be described with reference to FIG. 1. In a rotor blade rotation noise model, the time (t) dependency of sound pressure, and the angle (φ) dependency of a rotational direction are expressed by the following equation.

$$P(\phi, t) = \text{Re}\left\{\sum_{x=1}^{inf} a_x e^{iBx(\Omega t-\phi)}\right\}$$

As regards this multiple sound source, the phase rotates together with the rotor blades, and the multiple sound source has noise characteristics which are different from general noise radiation characteristics. Here, it is assumed that B is the number of blades of rotor blades, x is the order of harmonics, $\Omega$ is a blade rotation angular frequency, $i^2=-1$, and inf is infinity ($\infty$). The angular frequency of air blower noise that occurs is $\Omega Bx$, and $\Omega B$ of x=1 is called "blade passage frequency". In addition, for the purpose of simplicity, it is assumed that M=Bx. It is assumed that $a_x$ is a complex amplitude of x-order harmonics.

Figure 1:
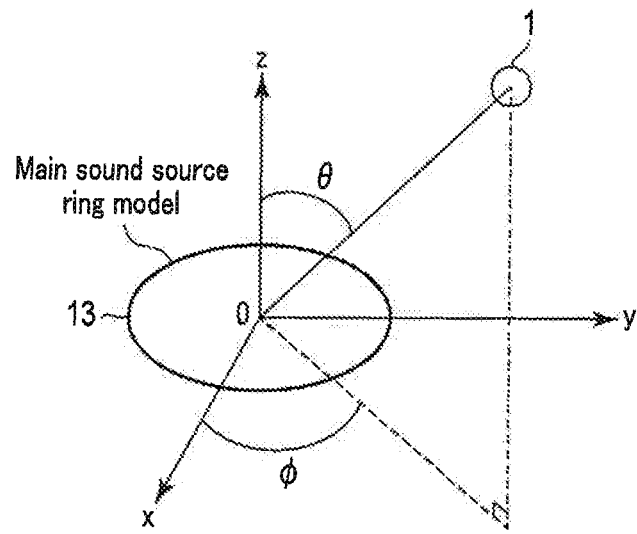
FIG. 1 is a view illustrating a main sound source ring model and a three-dimensional polar coordinate system corresponding to each of embodiments.

In the description below, three-dimensional (3D) coordinates illustrated in FIG. 1 are used as coordinates. FIG. 1 illustrates a main sound source ring model in an annular shape. Specifically, a Z axis is set in a direction in which a rotational axis 14 of a rotor blade 13 extends. An angle from an X axis in an XY plane is defined as an azimuth angle $\varphi$, and an angle of a target (here, a first speaker 1) from the Z axis is defined as an elevation angle $\theta$.

First Embodiment

Figure 2:
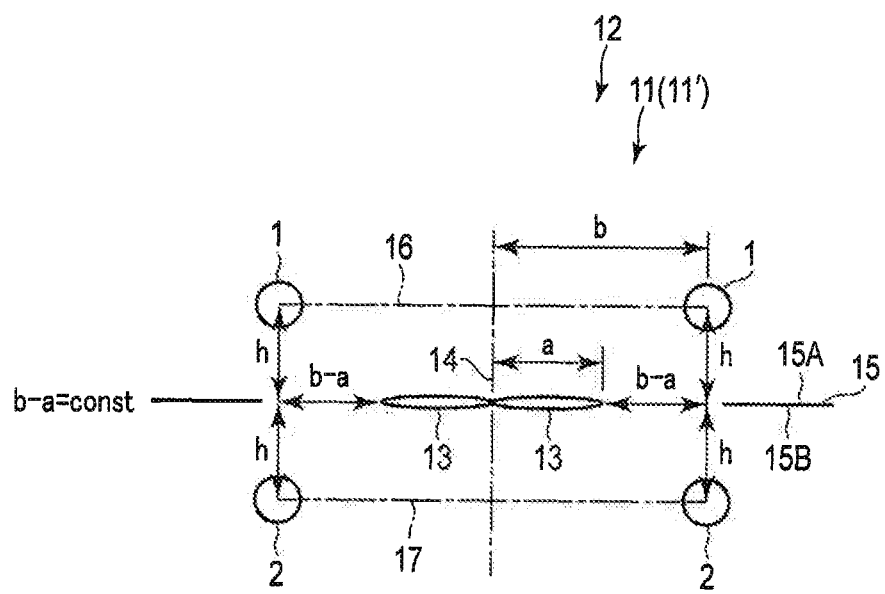
FIG. 2 is a schematic view illustrating a positional relationship between rotor blades of a case 1_1, first speakers and second speakers according to a first embodiment.

A rotor blade noise reduction system 11 of the present embodiment is installed, for example, near an axial-flow fan or a propeller of a flying object 12. In the rotor blade noise reduction system 11 of this embodiment, a case is assumed in which, in the axial-flow fan or propeller, a speaker radius b cannot be made close to a rotor blade radius a due to restrictions of an installation place, etc., i.e. a distance difference b-a between the rotor blade radius a and speaker radius b becomes large. FIG. 2 illustrates this condition as a case 1_1.

{Case 1_1}

In the description below, a rotor blade plane 15 is defined by the rotor blade 13 rotating about the rotational axis 14. In addition, it is assumed that the distance from the rotor blade plane 15 to a first circumference 16 on which first speakers 1 are disposed is h, and that the distance from the rotor blade plane 15 to a second circumference 17 on which second speakers 2 are disposed is h. Accordingly, in the case 1_1, the distance from the rotor blade plane 15 to the first circumference 16 is equal to the distance from the rotor blade plane 15 to the second circumference 17. In the case 1_1, assuming that b-a is constant, examinations were conducted as described below.

Figure 3:
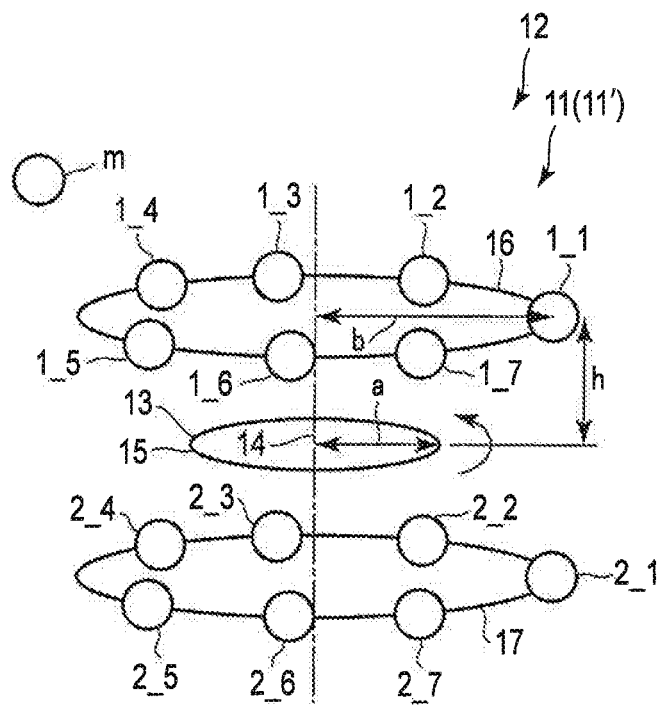
FIG. 3 is a perspective view illustrating a rotor blade noise reduction system of the first embodiment.

As illustrated in FIG. 3, the rotor blade noise reduction system 11 of the first embodiment is disposed, for example, in the flying object 12. The flying object 12 is, for example, a drone. Needless to say, the flying object 12 may be a passenger airplane, a helicopter, or the like. The rotor blade noise reduction system 11 includes a plurality of rotor blades 13 which are a noise generation source (sound source), a plurality of first speakers 1, a plurality of second speakers 2, at least one evaluation microphone m, and an active sound suppression processor 21. The rotor blade noise reduction system 11 has a so-called double-ring configuration in which rings of speakers are provided on both sides of the rotor blades 13. The rotor blades 13 are rotatable about the rotational axis 14. The rotor blade plane 15 is defined by the rotor blades 13 which rotate about the rotational axis 14. The evaluation microphone acquires noise generated from the rotating rotor blades, and control sound generated from the first speakers and second speakers. A noise reduction system 11' has substantially the same configuration as the rotor blade noise reduction system 11, but the noise reduction system 11' is a concept in which the rotor blades 13 are not included.

The first speakers 1 (first control speakers) are arranged equidistantly on the first circumference 16. The center of the first circumference 16 is coaxial with the rotational axis 14 of the rotor blades 13. The first circumference 16 is located apart from the rotor blade plane 15 by the distance h. The first circumference 16 is parallel to the rotor blade plane 15 and is opposed to one surface 15A of the rotor blade plane 15. The number of first speakers 1 is arbitrary. For example, the number of first speakers 1 may be "$2 \times M_{min}+1$" or more, preferably "$2 \times M_{min}+3$" or more. Here, M is determined so as to satisfy the following equation (*).

$$M=B \times x + V \times k \quad (*)$$

Here, B is the number of blades of the rotor blades, x is a noise reduction order of a target, V is the number of blades of stationary blades, and k is an arbitrary integer. The above-described "$M_{min}$" is the minimum value of the equation (*). In the case 1_1, when the rotor blade radius is a and the speaker radius is b, the relationship of b>a is established. In FIG. 3, a first one of the first speakers, which serves as a standard, is expressed as "standard first speaker 1_1". Another of the first speakers, the azimuth angle of which is displaced relative to the standard first speaker 1_1 by a predetermined angle in the same direction as the rotational direction (an arrow in FIG. 3) of the rotor blades 13, is expressed as "first speaker 1_2". Still another of the first speakers, the azimuth angle of which is displaced relative to the first speaker 1_2 by a predetermined angle in the same direction as the rotational direction of the rotor blades 13, is expressed as "first speaker 1_3". Similarly, the following first speakers are expressed as "first speaker 1_4", "first speaker 1_5", . . . .

Likewise, the second speakers 2 (second control speakers) are arranged equidistantly on the second circumference 17. The center of the second circumference 17 is coaxial with the rotational axis 14 of the rotor blades 13. The second circumference 17 is located apart from the rotor blade plane 15 by the distance h. The second circumference 17 is parallel to the rotor blade plane 15 and is opposed to the other surface 15B of the rotor blade plane 15, which is on the opposite side of the one surface 15A.

The number of second speakers 2 is arbitrary. For example, the number of second speakers 2 may be "$2 \times M_{min}+1$" or more, preferably "$2 \times M_{min}+3$" or more. Here, M is determined so as to satisfy the following equation (*).

$$M=B \times x + V \times k \quad (*)$$

Here, B is the number of blades of the rotor blades, x is a noise reduction order of a target, V is the number of blades of stationary blades, and k is an arbitrary integer. The above-described "$M_{min}$" is the minimum value of the equation (*). The number of second speakers 2 is the same as the number of first speakers 1. In the second circumference 17, too, the relationship of b>a is established. In FIG. 3, a first one of the second speakers, which serves as a standard, is expressed as "standard second speaker 2_1". Another of the second speakers, the azimuth angle of which is displaced relative to the standard second speaker 2_1 by a predetermined angle in the same direction as the rotational direction of the rotor blades 13, is expressed as "second speaker 2_2".

Still another of the second speakers, the azimuth angle of which is displaced relative to the second speaker 2_2 by a predetermined angle in the same direction as the rotational direction of the rotor blades 13, is expressed as "second speaker 2_3". Similarly, the following second speakers are expressed as "second speaker 2_4", "second speaker 2_5", . . . . In the present embodiment, the azimuth angle of each of the second speakers 2 agrees with the azimuth angle of each of the first speakers 1. Thus, when viewed from the extension direction of the rotational axis 14 (i.e. from a far-side point on the Z axis), the second speakers 2 are provided at positions overlapping the first speakers 1. Besides, as illustrated in FIG. 3, the evaluation microphone m may be disposed at a predetermined position.

Figure 4:
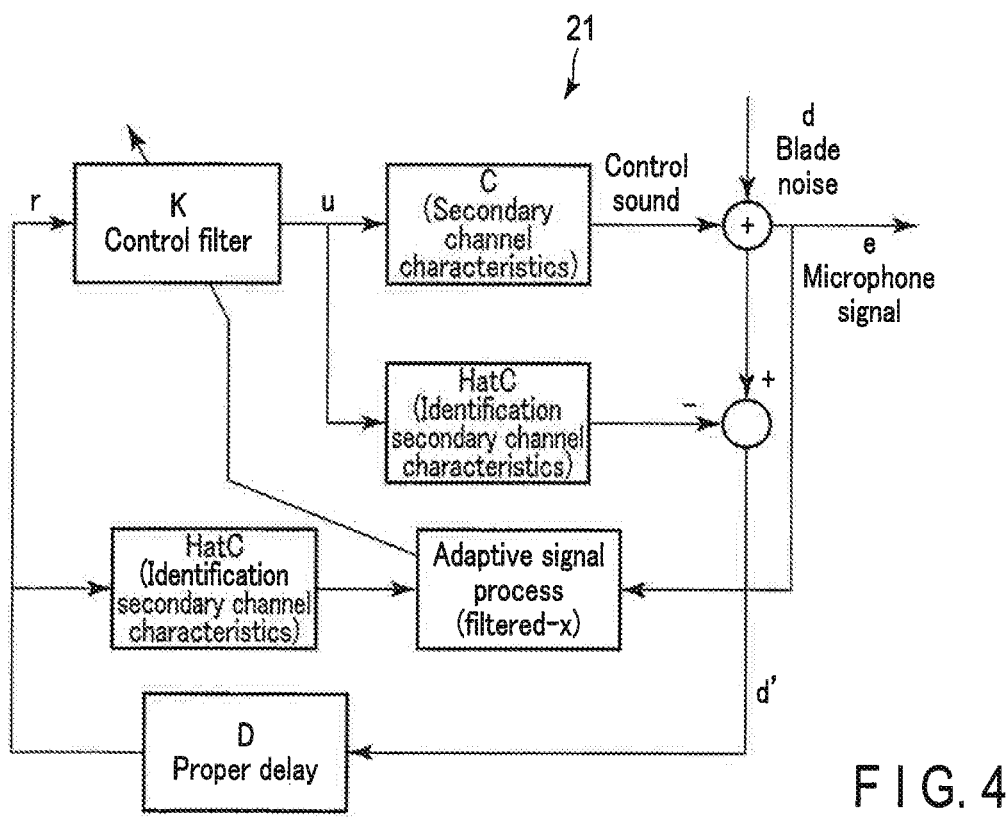
FIG. 4 is a block diagram illustrating a configuration of an ANC algorithm of a feedback type using a filtered-x of the rotor blade noise reduction system of the first embodiment.

FIG. 4 and FIG. 5 illustrate general configurations (active sound suppression processor 21) of the filtered-x, which is an ANC algorithm. FIG. 4 illustrates a feedback type in which a reference signal r is internally generated, and a reference signal generator is needless. The system configuration is simple and is suited to reduction of rotor/stationary blade interference noise which is cyclic noise. Note that secondary channel characteristics C are transmission characteristics up to the evaluation microphone m at a time when a control input u (1 input) is input to each speaker (first speaker 1, second speaker 2) by using a distributor illustrated in FIG. 6. Thus, this configuration is a 1-input/1-output active sound suppression system, and the calculation amount can be reduced, compared to a multi-channel ANC.

FIG. 5 illustrates a feed-forward type. A rotor blade rotational angle is measured by a rotary encoder or the like, a rotor blade passage timing is measured by a laser pulse or the like, a reference signal is generated, and active sound suppression is implemented. Compared to the configuration of FIG. 4, there is an advantage that an exact reference signal can be obtained, but there is a problem that the configuration becomes large. In the present embodiment, each of the configurations of FIG. 4 and FIG. 5 can be adopted.

As illustrated in FIG. 6, in the present embodiment, a proper delay amount is applied to a control signal u which is an output from a control filter K, by a distributor/delay device 18 included in the active sound suppression processor 21. Specifically, a delay amount expressed by the following equation is applied.

$$\text{delay}_i = \frac{2\pi i}{\Omega L_c}$$

The distributor/delay device 18 generates, for the respective first speakers 1, a plurality of first delay control signals obtained by delaying the control signal by a predetermined time in accordance with a displacement amount of an azimuth angle relative to the azimuth angle of the standard first speaker 1_1. The active sound suppression processor 21 inputs to the first speakers 1 the first delay control signals corresponding to the first speakers 1. The distributor/delay device 18 generates, for the respective second speakers 2, a plurality of second delay control signals obtained by delaying the control signal by a predetermined time in accordance with a displacement amount of an azimuth angle relative to the azimuth angle of the standard second speaker 2_1. The active sound suppression processor 21 inputs to the second speakers 2 the second delay control signals corresponding to the second speakers 2. The active sound suppression processor 21 includes a plurality of speaker amplifiers for amplifying the first delay control signals (second delay control signals) at positions between the distributor/delay device 18 and the speakers (first speakers 1, second speakers 2).

To be more specific, first delay control signals u1 to uLc, which are properly delayed, are input to the respective first speakers 1. Lc is the number of first speakers 1. $\Omega$ is a rotor blade rotation angular velocity. Thereby, the control signal u1 is input to the first speaker 1_1. Similarly, the control signal u2, control signal u3, . . . , and control signal uLc are input to the first speaker 1_2, first speaker 1_3, . . . , and first speaker 1_Lc, respectively.

Second delay control signals u1 to uLc, which are properly delayed, are input to the respective second speakers 2. In the present embodiment, since the azimuth angles of the respective second speakers 2 are identical to the azimuth angles of the respective first speakers 1, the control signals of the same delay amount are input to the first speaker 1 and second speaker 2 which are located at the same azimuth angle. Accordingly, the respective second delay control signals u1 to uLc are identical to the respective first delay control signals u1 to uLc. Thus, the control signal u1 is input to the second speaker 2_1. Similarly, the control signal u2, control signal u3, . . . , and control signal uLc are input to the second speaker 2_2, second speaker 2_3, . . . , and second speaker 2_Lc, respectively. Therefore, in the present embodiment, a plurality of speaker amplifiers can be commonly used between the first speakers 1 and second speakers 2, and the number of speaker amplifiers is reduced (halved), compared to the case in which control signals are made different between the first speakers 1 and second speakers 2. It is assumed that the secondary channel characteristics used in the active sound suppression system are transmission characteristics (space propagation characteristics) from the control signal u to the evaluation microphone m, and are channel characteristics at a time when all speakers (first speakers, second speakers) are simultaneously driven.

In the rotor blade noise reduction system 11 (noise reduction system 11') with the above-described configuration, Examples in which respective conditions are set in detail will be described hereinafter.

Example 1

A control effect improvement result (target order x is 1) of the rotor blade noise reduction system 11 (noise reduction system 11') of the double-ring configuration at a time when the number of rotor blades is two, the rotor blade radius a is 0.4 m and the rotor blade rotation cycle is 40 Hz is illustrated. Note that in Example 1, in order to evaluate the basic performance of the above-described embodiment, the evaluation microphone m is not used, and the reduction amount of acoustic power at a time of optimal control is illustrated.

FIG. 7 illustrates the result. The abscissa axis indicates a ratio between the first ring radius b and rotor blade radius a, and the ordinate axis indicates an ANC control effect (reduction level [dB]). In addition, h=0 (m) indicates an effect of a so-called single ring (the case in which only first speakers are disposed) in which the second speakers 2 are not provided. At this time, it is understood that the control effect (reduction level of acoustic power) is highest in the case of b=a. However, as the radius b of the first circumference becomes greater, the reduction effect decreases. For example, in the case of h=0.16 (m), the control effect becomes maximum at b/a=1.4, and it is understood that the control effect increases by 13.6 dB, compared to the control effect of the single ring (h=0 (m)) under the same conditions.

It is also understood that as regards other radius ratios (b/a), the control effect can be improved by the double-ring configuration using a proper inter-ring distance h.

Example 2

A control effect improvement result (target order x is 1) of the rotor blade noise reduction system 11 (noise reduction system 11') of the double-ring configuration at a time when the number of rotor blades is three, the rotor blade radius a is 0.3 m and the rotor blade rotation cycle is 60 Hz is illustrated. Like Example 1, in Example 2, in order to evaluate the basic performance of the above-described embodiment, the evaluation microphone m is not used, and the reduction amount of acoustic power at a time of optimal control is illustrated.

Figure 8:
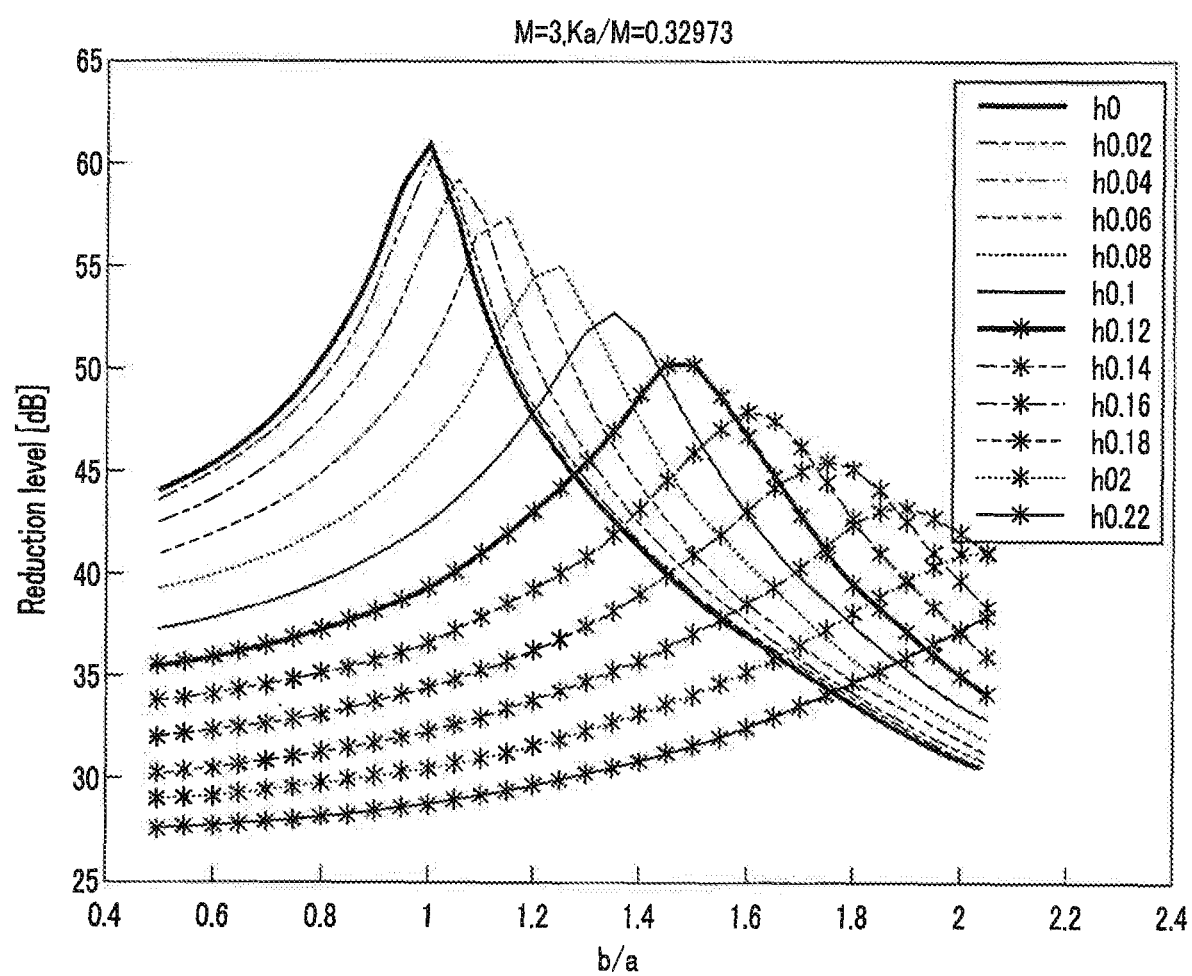
FIG. 8 is a graph illustrating a reduction level of acoustic power of Example 2 of the first embodiment.

FIG. 8 illustrates the result. Also when the number of rotor blades and the rotor blade radius a are changed, it is understood that, like Example, 1, the control effect of the rotor blade noise reduction system 11 (double-ring configuration) is high, i.e. the reduction level of acoustic power is high.

Figure 9:
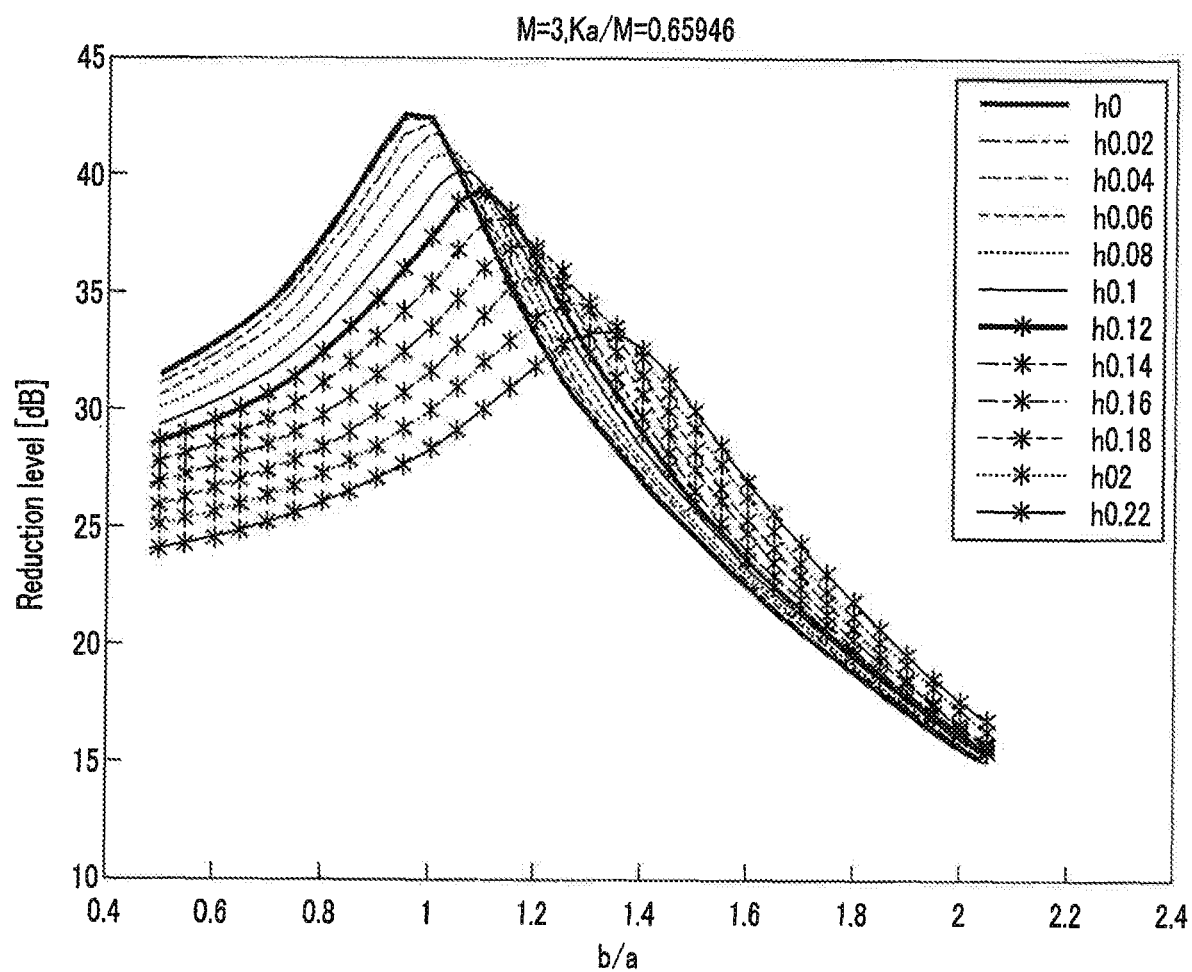
FIG. 9 is a graph illustrating a reduction level of acoustic power of another example of Example 2 of the first embodiment.

On the other hand, when the rotor blade radius a is set to 0.6 m (double the rotor blade radius a in the Example of FIG. 8), a result illustrated in FIG. 9 is obtained, and it is understood that the control effect of the rotor blade noise reduction system 11 (double-ring configuration) lowers. The reason for this is that, when the rotor blade rotational speed is 60 Hz and is relatively high (the target noise frequency is 180 Hz (60*3)), the radius difference b-a becomes large and proper sound wave interference becomes difficult. It is thus understood that in the case 1_1, the present embodiment (double-ring configuration) is particularly effective when a Mach number is 0.65 or less.

Example 1_2

As Example 1_2 in which Example 1 is partly modified, an evaluation method relating the setting of optimal h is illustrated. If the optimal h is set from the results of FIG. 7 and FIG. 8, the reduction effect is improved, compared to the control effect of the single ring (conventional art). On the other hand, depending on the setting of h, there is a case in which the control effect becomes worse than the result of the single ring. The inventors found, as a result of tremendous research effort, a method for deriving the optimal h. In this method, by finding h which maximizes an evaluation function J [dB], the value of the optimal h can be calculated. The evaluation function J is $$J = -10\log 10\left(\text{Re}\left\{-\frac{2BC}{(A+E)D}+1\right\}\right)$$

Here, Re{ } means that a real part of a complex number in { } is taken. Further, $$A = \sum_{i=1}^{Lc}\sum_{j=1}^{Lc}\beta_i\beta_j^*\text{sinc}(kd_{s1_is1_j}),$$

$$B = \sum_{i=1}^{Lc}\sum_{j=1}^{Lp}\beta_i\alpha_j^*\text{sinc}(kd_{s1_ip_j}),$$

-continued $$C = \sum_{i=1}^{Lp}\sum_{j=1}^{Lc}\alpha_i\beta_j^*\text{sinc}(kd_{p_is1_j}),$$

$$D = \sum_{i=1}^{Lp}\sum_{j=1}^{Lp}\alpha_i\alpha_j^*\text{sinc}(kd_{p_ip_j}),$$

$$E = \sum_{i=1}^{Lc}\sum_{j=1}^{Lc}\beta_i\beta_j^*\text{sinc}(kd_{s1_is2_j}),$$

$$\alpha_i = \exp\left(-jM\frac{2\pi i}{L_p}\right),$$

$$\beta_i = \exp\left(-jM\frac{2\pi i}{L_c}\right)$$

In addition, $L_p$ is the number of main sound sources (noise sources), and $L_c$ is the number of control sound sources (the number of first speakers 1 and second speakers 2), and it is assumed that 2M+3 or more is used for each of these numbers. Besides, k is a wave number, and d is a distance between two points. For example, $d_{s1_is1_j}$ is a distance between an i-th first speaker 1 and a j-th first speaker, and $d_{p_is1_j}$ is a distance between an i-th sound source (noise source) and a j-th first speaker 1. M=Bx, where B is the number of rotor blades, and x is an order. In this case, the target order x=1. Besides, $\alpha^*$ is a conjugate complex number of $\alpha$, and $\beta^*$ is a conjugate complex number of $\beta$.

Under the conditions of Example 1, the evaluation function J is plotted as illustrated in FIG. 10. It is understood that when b−a=0.15, approximately h=0.16 is the optimal h. In this case, b=0.55 and b/a=1.375. If this is further examined in FIG. 7, the reduction level of acoustic power becomes exactly maximum at approximately b/a=1.4 when h=0.16. From the above, it is understood that the evaluation function J can be used as an evaluation index. Note that since J is a unimodal function, a plot of the evaluation function J may be created by setting h in units of 0.01 to 0.001 m, and the optimal h (max process) at which the maximum value is taken may be calculated.

{Case 1_2}

Figure 11:
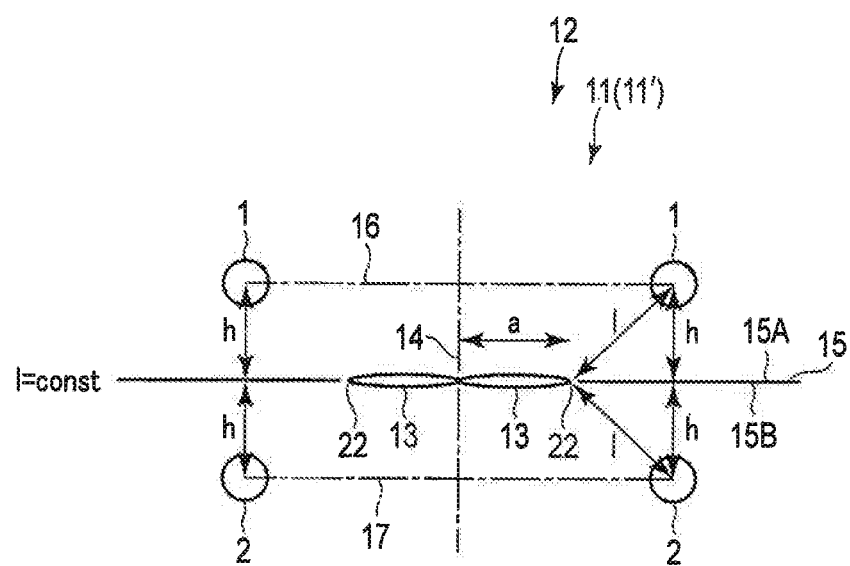
FIG. 11 is a schematic view illustrating a positional relationship between rotor blades of a case 1_2, the first speakers and the second speakers according to the first embodiment.

Hereinafter, as illustrated in FIG. 11, it is assumed that the distance from the rotor blade plane 15, which is defined by the rotor blade 13 rotating about the rotational axis 14, to the first circumference 16, on which the first speakers 1 are disposed, is h, and the distance from the rotor blade plane 15 to the second circumference 17, on which the second speakers 2 are disposed, is h. A distance from a rotor blade end 22 to the speaker (first speaker 1, second speaker 2) is set to 1, and the following examinations were conducted by setting 1 to be constant.

Example 3

A control effect (target order x is 1) of the rotor blade noise reduction system 11 (noise reduction system 11') of the double-ring configuration at a time when the number of rotor blades is two, the rotor blade radius a is 0.4 m and the rotor blade rotation cycle is 40 Hz is illustrated. Note that in Example 3, in order to evaluate the basic performance of the above-described embodiment, the evaluation microphone m is not used, and the reduction amount of acoustic power at a time of optimal control is illustrated.

Figure 12:
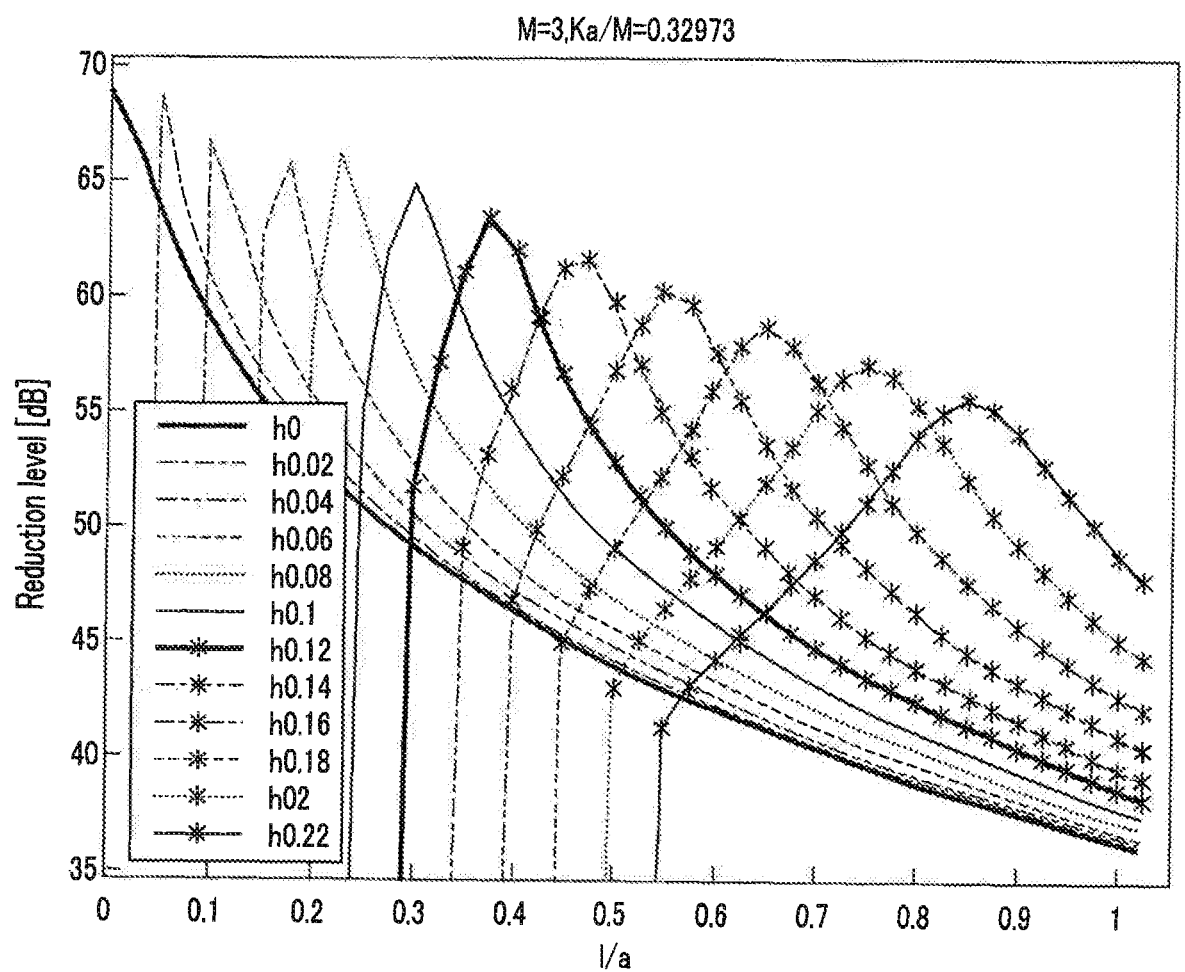
FIG. 12 is a graph illustrating a reduction level of acoustic power of Example 3 of the first embodiment.

FIG. 12 illustrates the control result. The abscissa axis indicates a ratio between the distance 1 between the rotor blade end 22 and the SP, and the rotor blade radius a, and the ordinate axis indicates an ANC control effect. In addition, h=0 indicates an effect of the single-ring configuration. Unlike the result of FIG. 7, in the case 1_2, compared to the single-ring configuration, there is substantially no range of h, in which the control effect decreases. It is confirmed that, in any case, the control effect of the double-ring configuration is improved (i.e. the acoustic power of noise is reduced). For example, when l=0.22, l/a becomes 0.55, and at h=0.16, the acoustic power decreases by approximately 17 [dB], compared to the single-ring configuration.

With respect to other rotor blade rotation cycles and other numbers of rotor blades, too, the control effect by the double-ring configuration is improved compared to the single-ring configuration. Thus, in the case 1_2, there is no limitation to the Mach number as in Example 2 of the case 1_1.

Example 3_2

As a modification of Example 3, a setting method of optimal h in Example 3 is illustrated. Unlike FIG. 7, in the case 1_2, the control effect does not become worse than in the single-ring configuration. However, it is desired to set the optimal h which maximizes the control effect. On the other hand, the inventors found, as a result of tremendous research effort, that the optimal h can be derived by using the same evaluation function J as in Example 1_2.

Specifically, the evaluation function J is $$J = -10\log10\left(\text{Re}\left\{-\frac{2BC}{(A+E)D}+1\right\}\right)$$

Figure 13:
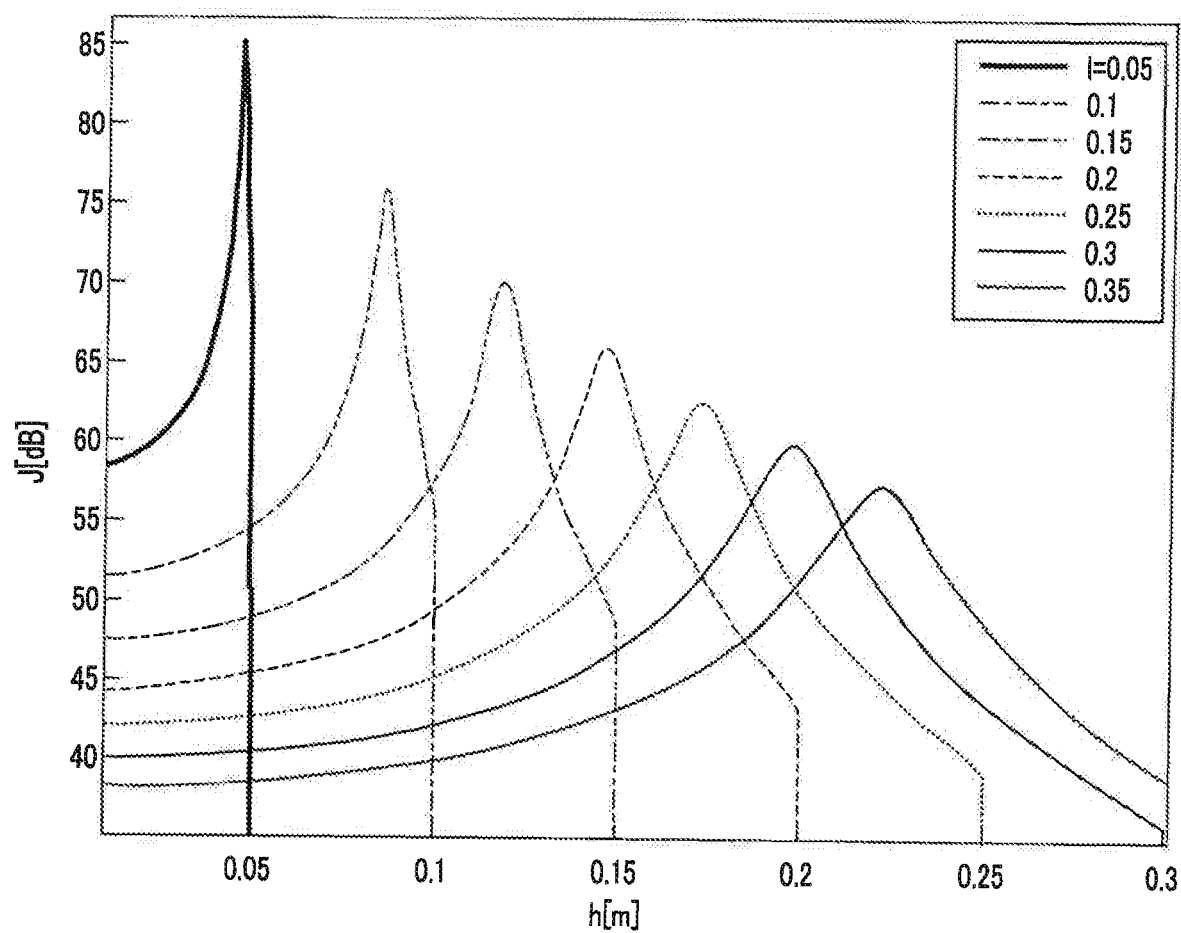
FIG. 13 is a graph illustrating a plot of an evaluation function J in Example 3_2 of the first embodiment.

The definition of each number included in J is the same as in Example 1_2. In addition, like Example 1_2, h that maximizes the evaluation function J [dB] is selected. For example, the evaluation function in the setting of Example 3 is plotted as illustrated in FIG. 13. Note that since J is a unimodal function, data and a plot thereof may be created by setting h in units of 0.01 to 0.001 m, and the optimal h (max process) at which the maximum value is taken may be calculated.

By referring to FIG. 13, it is understood that when l=0.2, approximately h=0.15 becomes the optimal h. At this time, since l/a=0.5, if an examination is made in FIG. 12, it is understood that the control effect is high in the neighborhood of l/a=0.5 in the plot of h=0.16. Therefore, the evaluation function J can be used as the evaluation index.

{Case 2}

Each of Examples below deals with a case in which the speakers (first speakers, second speakers) cannot be installed on the rotor blade plane. The control effect of the rotor blade noise reduction system 11 (noise reduction system 11') of the double-ring configuration of the embodiment is examined from the difference from the control effect of the single-ring configuration.

Example 4

A control effect improvement result (target order x is 1) of the rotor blade noise reduction system 11 (noise reduction system 11') of the double-ring configuration at a time when the number of rotor blades is two, the rotor blade radius a is 0.4 m and the rotor blade rotation cycle is 40 Hz is illustrated. Note that in Example 4, in order to evaluate the basic performance of the present proposed configuration, the evaluation microphone m is not used, and the reduction amount of acoustic power at a time of optimal control is illustrated.

FIG. 14 illustrates the result. The abscissa axis indicates a ratio between the control SP ring radius b and the rotor blade radius a, and the ordinate axis indicates an ANC control effect. Solid lines arranged in an upper part of the graph of FIG. 14 indicate the result of the rotor blade noise reduction system 11 (double-ring configuration), and broken lines arranged in a lower part of the graph of FIG. 14 indicate the result of the single-ring configuration. Values of h in a legend indicate distance differences between the main sound source ring (rotor blade plane 15) and control sound source ring (first circumference 16, second circumference 17). From the result of FIG. 14, it is understood that, in any of the distance differences h and radius ratios, the control effect is greatly improved (the reduction level of acoustic power is increased) by adopting the double-ring configuration.

{Case 3}

In order to actually implement the above {Case 1_1}, {Case 1_2} and {Case 2}, there are (1) a method of estimating a main sound source volume velocity by using a plurality of evaluation microphones, and determining outputs to the control speakers (first speakers, second speakers), and (2) a method of indirectly reducing acoustic power by disposing an evaluation microphone (evaluation point) and reducing a microphone signal. Example 5 below illustrates an example of the latter method of setting a proper disposition position of the evaluation microphone (evaluation point). Example 6 illustrates the former method of using the plural evaluation microphones.

Example 5

Figure 15:
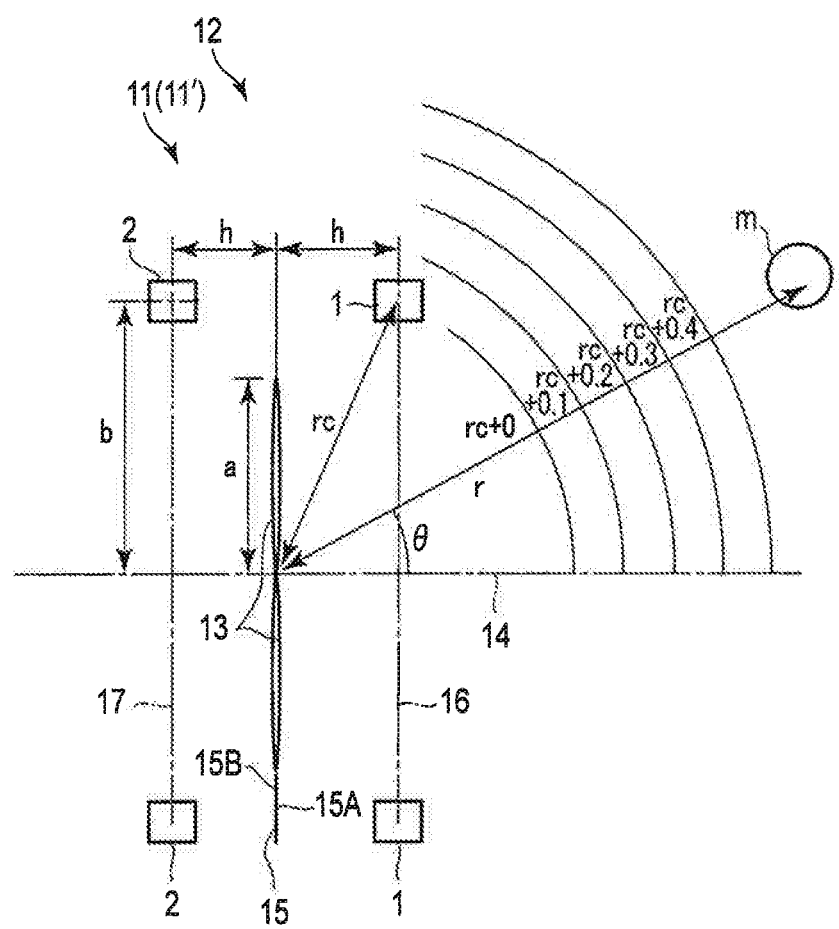
FIG. 15 is a schematic view illustrating a positional relationship between rotor blades, first speakers, second speakers and an evaluation microphone of a rotor blade noise reduction system of Example 5 of the first embodiment.

FIG. 15 illustrates a positional relationship between rotor blades 13 (ring sound source), first speakers 1, second speakers 2 and an evaluation microphone m of the rotor blade noise reduction system 11 (noise reduction system 11') of the double-ring configuration of the present Example. In this Example, the number of rotor blades is two, the rotor blade radius a is 0.4 m and the rotor blade rotation cycle is 40 Hz. The number of evaluation microphones m is one. In addition, the speaker (first speaker 1, second speaker 2) radius b is set at 0.56 m, with which the control effect of the rotor blade noise reduction system 11 (double-ring configuration) in the above Example was high, the inter-ring distance h is set to h (h is a proper constant), and the distance from the center of the rotor blades 13 (the center of the main sound source ring model) to the speaker (first speaker 1, second speaker 2) is set to rc. Furthermore, the distance from the center of the rotor blades 13 (the center of the main sound source ring model) to the evaluation microphone m is set to be greater than rc, i.e. set to rc+0.1 m, rc+0.2 m, rc+0.3 m, . . . . Besides, in the present Example, the azimuth angle φ of the evaluation microphone m is set to be identical to the azimuth angle of the first standard speaker 1_1. FIG. 16 illustrates variations of the control effect due to the position of the evaluation microphone m in this case. Note that the abscissa axis indicates an elevation angle θ.

From the result of FIG. 16, it is understood that if the position at the proper elevation angle θ is set, the reduction level of 60 dB of acoustic power, which is equal in control effect to Example 1 can be achieved. However, in the present Example, the setting range of the proper elevation angle θ is narrow.

The inventors found, as a result of tremendous research effort, a method for deriving the optimal elevation angle θ. In this method, an evaluation function $J_2$ is used. The elevation angle θ can be calculated as a value which minimizes the evaluation function $J_2$ below.

$$J_2 = \left| \frac{X}{Y+Z} - \frac{C}{A+E} \right|$$

Here, $$X = \sum_i^{Lp} \alpha_i e^{-jkr_{pi}} / r_{pi},$$

$$Y = \sum_i^{Lc} \beta_i e^{-jkr_{s1i}} / r_{s1i},$$

$$Z = \sum_i^{Lc} \beta_i e^{-jkr_{s2i}} / r_{s2i}$$

In addition, A, C, E, $\alpha_i$, $\beta_i$, $L_p$, and $L_c$ are the same as those in the above-described evaluation function J. Besides, r is a distance between two points, $r_{pi}$ is a distance from an i-th sound source (noise source) to the evaluation microphone m, $r_{s1i}$ is a distance from an i-th first speaker 1 to the evaluation microphone m, and $r_{s2i}$ is a distance from an i-th second speaker 2 to the evaluation microphone m. In addition, k is a wave number.

Figure 17:
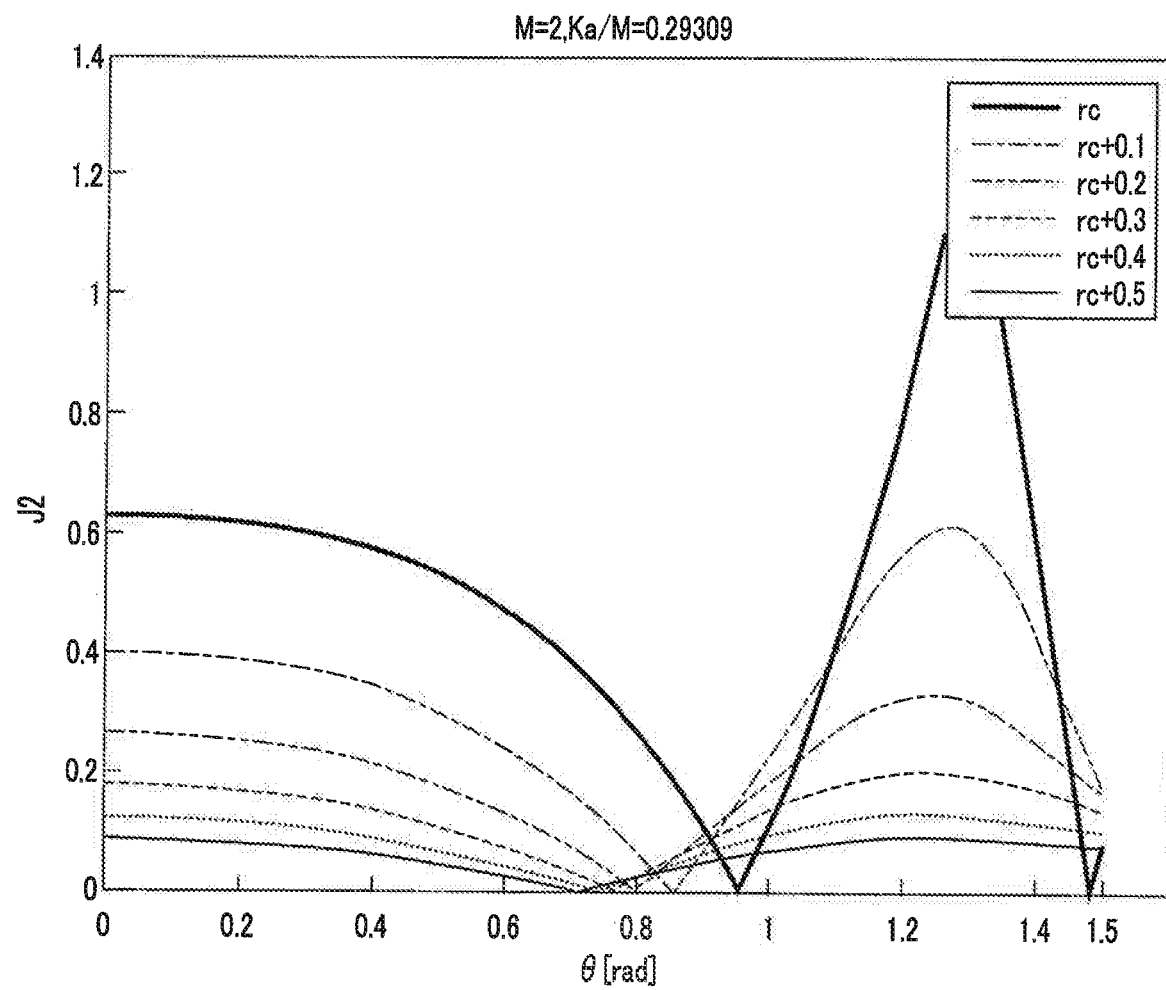
FIG. 17 is a graph illustrating a plot of an evaluation function $J_2$ in Example 5 of the first embodiment.

FIG. 17 illustrates a plot of $J_2$, and the minimum value substantially agrees with the peak in FIG. 16. It is understood that the elevation angle θ in a case in which $J_2$ takes the minimum value becomes the proper elevation angle.

Furthermore, the inventors found, as a result of tremendous research effort, another method for deriving the optimal elevation angle θ. In this method, an evaluation function $J_{2b}$ is used. An elevation angle $\theta_m$ can be calculated as a value which minimizes the evaluation function $J_{2b}$ below.

$$J_{2b}(\theta_m) = \sum_{\theta=0}^{\pi/2} \{T(a, r_t, \theta, \phi_t) - k(\theta_m) \times T(b, r_t, \theta, \phi_t)\} \quad (1)$$

Here, $$T(a, lm, \theta_m, \phi_m) = \sum_{i=1}^{Lp} \{(1/(4\pi r_{pi})) \times e^{-jkr_{pi}} \alpha_i\} \quad (2)$$

$$T(b, lm, \theta_m, \phi_m) = \sum_{i=1}^{Lc} \{(1/(4\pi r_{s1i})) \times e^{-jkr_{s1i}} \beta_i\} + \sum_{i=1}^{Lc} \{(1/(4\pi r_{s2i})) \times e^{-jkr_{s2i}} \beta_i\} \quad (3)$$

$$T(a, lm, \theta_m, \phi_m) = k(\theta_m) \times T(b, lm, \theta_m, \phi_m) \quad (4)$$

$$\alpha_i = \exp\left(-jM\frac{2\pi i}{L_p}\right),$$

$$\beta_i = \exp\left(-jM\frac{2\pi i}{L_c}\right)$$

Here, $r_t$ is an evaluation radius, and is set, for example, as "3 m" on far side. In addition, $\varphi_t$ is an evaluation azimuth angle, and is set as, for example, "disposition azimuth angle of evaluation microphone m".

The principle of these evaluation equations is as follows. A ratio k ($\theta_m$) is determined, which achieves the above equation (4) that makes the sound wave coming from the rotor blade 13 at the position (lm, $\theta_m$, $\varphi_m$) of the evaluation microphone m agree with the sound wave coming from the control speakers, i.e. the first speakers 1 and second speakers 2. Using the above ratio, $\theta_m$ is calculated, which represents the noise reduction effect of the entire space and which minimizes the above equation (1) in which the difference between the sound pressure coming from the rotor blade 13 at each evaluation position (rt, θ, φt) (0<=θ<=π/2) and the value obtained by multiplying the sound pressure coming from the control speaker by the above ratio is added. Thereby, the noise reduction effect of the entire space can be achieved. Here, the evaluation position is set as 0<=θ<=π/2, because of the axial symmetry.

Example 5_2

Figure 18:
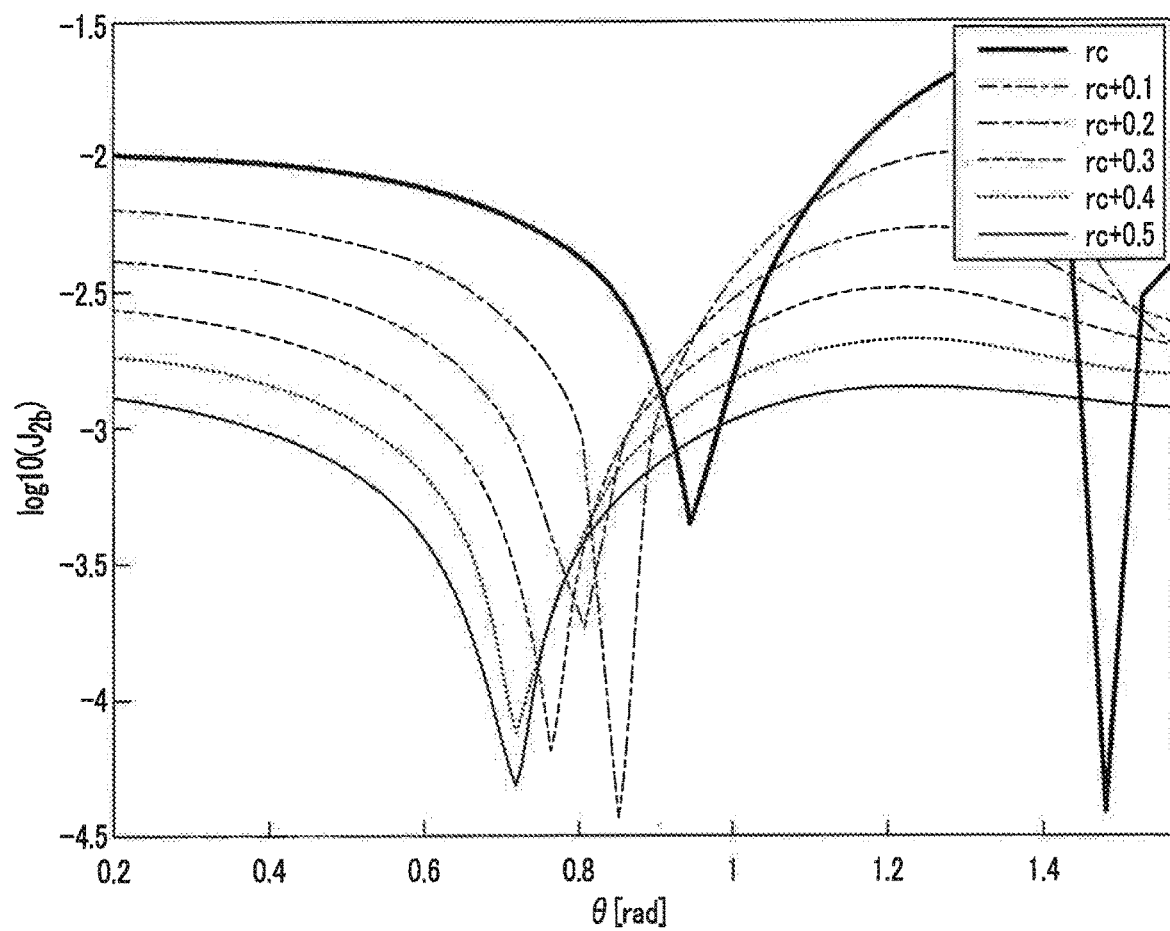
FIG. 18 is a graph illustrating a plot of an evaluation function $J_{2b}$ in Example 5_2 of the first embodiment.

FIG. 18 illustrates a plot of $J_{2b}$, and the minimum value substantially agrees with the peak in FIG. 16. It is understood that the elevation angle θ in a case in which $J_{2b}$ takes the minimum value becomes the proper elevation angle. Although the case of the double-ring configuration of the present Example was illustrated, the microphone elevation angle $\theta_m$ in the ordinary single ring can be calculated as the value which minimizes the evaluation function $J_{2b'}$ below.

$$J_{2b'}(\theta_m) = \sum_{\theta=0}^{\pi/2} \{T(a, r_t, \theta, \phi_t) - k(\theta_m) \times T(b, r_t, \theta, \phi_t)\} \quad (5)$$

Here, $$T(a, lm, \theta_m, \phi_m) = \sum_{i=1}^{Lp} \{(1/(4\pi r_{pi})) \times e^{-jkr_{pi}} \alpha_i\} \quad (6)$$

$$T(b, lm, \theta_m, \phi_m) = \sum_{i=1}^{Lc} \{(1/(4\pi r_{s1i})) \times e^{-jkr_{s1i}} \beta_i\} \quad (7)$$

$$T(a, lm, \theta_m, \phi_m) = k(\theta_m) \times T(b, lm, \theta_m, \phi_m) \quad (8)$$

The definition of each number is the same as described above.

Comparative Example

Figure 19:
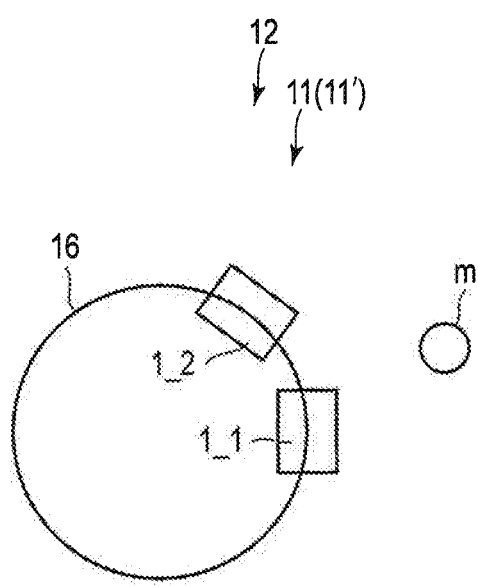
FIG. 19 is a schematic view illustrating a positional relationship between a reference first speaker 1_1, a first speaker 1_2 neighboring the standard first speaker 1_1, and an evaluation microphone of a comparative example.

Here, although not an Example, as a comparative example, a description of given of a control effect in a case in which an evaluation microphone is disposed at an improper azimuth angle, as illustrated in FIG. 19. In the comparative example, the azimuth angle of the evaluation microphone m is set at a substantially middle position between the azimuth angle of the standard first speaker 1_1 and the azimuth angle of the first speaker 1_2 which neighbors the standard first speaker 1_1. In this case, as illustrated in FIG. 20, the reduction effect of acoustic power considerably deteriorates, as illustrated in FIG. 20. The reason for this is that, since the speakers (speaker ring) of discrete control are used, the control sound pressure lowers between the speakers.

Example 6

In order to actually implement the above {Case 1_1}, {Case 1_2} and {Case 2}, there is a method of estimating a main sound source volume velocity by using a plurality of evaluation microphones m, and determining outputs to the control speakers.

Figure 21:
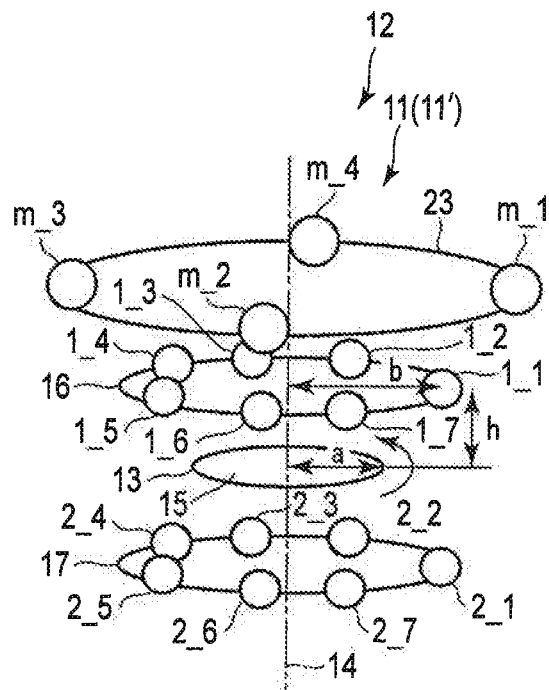
FIG. 21 is a perspective view illustrating Example 6 of the rotor blade noise reduction system of the first embodiment.

In Example 5, the setting range of the elevation angle θ is narrow. If the elevation angle can be exactly adjusted within the setting range, no problem arises. However, if the position of disposition of the evaluation microphone m deviates from the setting range even slightly, the reduction effect of acoustic power sharply deteriorates. For example, as in the comparative example, when the evaluation microphone m is disposed at the azimuth angle between the first speakers 1, the reduction effect of acoustic power considerably deteriorates. To improve the problem, in the rotor blade noise reduction system 11 (noise reduction system 11') of the double-ring configuration of Example 6, the evaluation microphones m are disposed in a ring shape on a third circumference 23 (signals are properly delayed), as illustrated in FIG. 21, and the influence of the azimuth angle of the evaluation microphone m is reduced. The third circumference 23 is parallel to the rotor blade plane 15. The radius of the third circumference 23 is greater than the radius of the first circumference 16. It is preferable that the number of evaluation microphones m is three or more. In this Example, the number of evaluation microphones m is, for example, four, but this number may be three.

Figure 22:
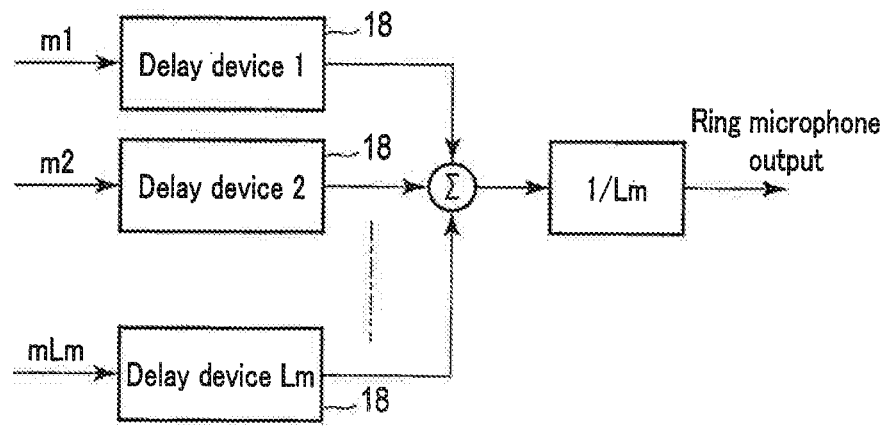
FIG. 22 is a block diagram illustrating an output calculation configuration of an evaluation ring microphone of Example 6 of the rotor blade noise reduction system illustrated in FIG. 21.

FIG. 22 illustrates an output calculation method of the evaluation ring microphone. A proper delay amount expressed below is applied to each microphone signal mi.

$$\text{delay}_i = \frac{2\pi i}{\Omega L_m}$$

Here, $\Omega$ is the rotor blade rotation angular velocity, Lm is the number of evaluation microphones, and i is a microphone number. As illustrated in FIG. 21, the displacement of the azimuth angle of the evaluation microphone m_i is set in a direction opposite to the rotor blade rotational direction indicated by an arrow around the rotor blades 13 (main sound source ring model), and an evaluation microphone m_1, evaluation microphone m_2, evaluation microphone m_3 and evaluation microphone m_4 are disposed in the direction opposite to the rotor blade rotational direction. In the output calculation method of the evaluation ring microphone, which is illustrated in FIG. 22, one ring microphone output is formed by averaging the sum of microphone signals mi which are delayed by delay devices 1 to Lm (delay devices 18). By using the above-described ring microphone, acquisition of sound other than blade noise can be reduced.

Example 6

FIG. 23 illustrates, by a solid line, a result of the equidistant disposition of three evaluation microphones m in a ring shape in Example 6. In addition, FIG. 23 illustrates a result of Example 5 by a dot-and-dash line. From the result indicated by the solid line in FIG. 23, it is understood that in Example 6, when the distance from the center of the rotor blades 13 (the center of the main sound source ring model) to the evaluation microphone m is increased (rc+0.2 or more), the range of the settable elevation angle θ becomes wider than in Example 5 in a region higher than 47 dB. This reduction level 47 dB of acoustic power is a reduction level obtained in the case of the single-ring configuration. In the rotor blade noise reduction system 11 (noise reduction system 11') of the double-ring configuration of the present Example, the elevation angle is set in the range in which a reduction level higher than 47 dB can be obtained, from the standpoint of cost effectiveness.

From the above, it can be said that, by adopting the ring microphone configuration for evaluation microphones m, the influence of the displacement of the azimuth angle is reduced (the peak becomes gentler) and the settable range of the elevation angle is increased. Note that it is preferable to set a large distance from the center of the rotor blades 13 to the evaluation microphone m, in order to eliminate the influence of the discretely arranged speakers (first speakers 1, second speakers 2).

The inventors found, as a result of tremendous research effort, a method for deriving the optimal elevation angle θ. In this method, the elevation angle θ can be calculated as a value which minimizes an evaluation function $J_3$ below.

$$J_3 = \left| \frac{X'}{Y' + Z'} - \frac{C}{A + E} \right|$$

In this case, $$X' = \sum_i^{Lm} \left\{ \sum_j^{Lp} \alpha_j e^{-jkr_{pjmi}} / r_{pjmi} \right\} \gamma_i,$$

$$Y' = \sum_i^{Lm} \left\{ \sum_j^{Lc} \beta_j e^{-jkr_{s1jmi}} / r_{s1jmi} \right\} \gamma_i,$$

$$Z' = \sum_i^{Lm} \left\{ \sum_j^{Lc} \beta_j e^{-jkr_{s2jmi}} / r_{s2jmi} \right\} \gamma_i,$$

$$\gamma_i = \exp\left( jM \frac{2\pi i}{L_m} \right)$$

A, C, E, $\alpha_i$ and $\beta_i$ are the same as those in the above-described Example 1_2. In addition, r is a distance between two points, $r_{pjmj}$ is a distance from a J-th sound source (noise source) to an i-th evaluation microphone, $r_{s1jmi}$ is a distance from a J-th first speaker to the i-th evaluation microphone, and $r_{s2jmi}$ is a distance between a J-th second speaker and the i-th evaluation microphone. Besides, k is a wave number.

Furthermore, the inventors found, as a result of tremendous research effort, another method for deriving the optimal elevation angle θ. When the ring microphone configuration is adopted, θm can be determined by making $L_c$ much greater than the actual number of disposition of speakers. The reason for this is that, by increasing $L_c$, the variation of a sound pressure distribution in the φ direction due to the discrete speaker disposition can be suppressed, and the space smoothing effect by the ring microphone configuration can be simulated.

Example 6_2

Figure 24:
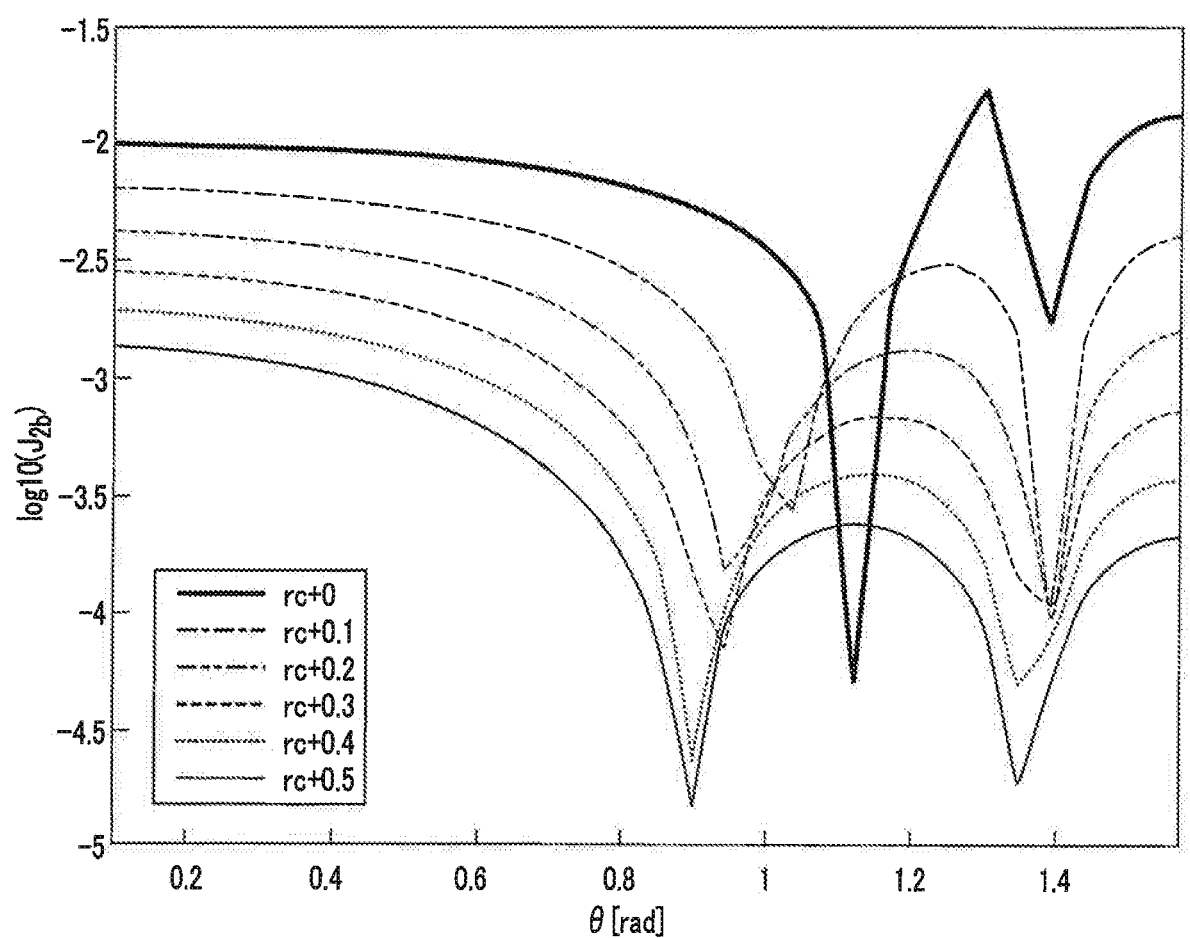
FIG. 24 is a graph illustrating a plot of an evaluation function $J_{2b}$ (Lc=36) in Example 6_2 of the first embodiment.

FIG. 24 illustrates a plot of $J_{2b}$ (Lc=36). It is understood that the minimum value substantially agrees with the peak in FIG. 23, and the elevation angle θ in a case in which $J_{2b}$ takes the minimum value becomes a proper elevation angle. The exact evaluation equation is as follows. Specifically, the elevation angle θ can also be calculated as a value which minimizes an evaluation function $J_{3b}$. The evaluation function $J_{3b}$ is $$J_{3b}(\theta_m) = \sum_{\theta=0}^{\pi/2} \{T(a, r_t, {}^i\theta, \phi_t) - k(\theta_m) \times T(b, r_t, \theta, \phi_t)\}$$

Here, $$T(a, lm, \theta_m, \phi_m) = \sum_{i=1}^{Lm}\left\{\sum_{j=1}^{Lp}\left\{(1/(4\pi r_{pjmi})) \times e^{-jkr_{pjmi}}\alpha_i\right\}\gamma_i\right\},$$

$$T(b, lm, \theta_m, \phi_m) = \sum_{i=1}^{Lm}\left\{\sum_{j=1}^{Lc}\left\{(1/(4\pi r_{s1jmi})) \times e^{-jkr_{s1jmi}}\beta_i\right\}\gamma_i\right\} +$$

$$\sum_{i=1}^{Lm}\left\{\sum_{i=1}^{Lc}\left\{(1/(4\pi r_{s2jmi})) \times e^{-jkr_{s2jmi}}\beta_i\right\}\gamma_i\right\},$$

$$T(a, lm, \theta_m, \phi_m) = k(\theta_m) \times T(b, lm, \theta_m, \phi_m)$$

The definition of each number is the same as described above. However; the above method (the method of determining, by using FIG. 24, the elevation angle θ at which $J_{2b}$ (Lc=36) becomes minimum) is simpler.

In the above, the first embodiment and Examples 1-6 were described. According to these, the following can be said. The rotor blade noise reduction system 11 includes a plurality of rotor blades 13 which can rotate about the rotational axis 14; a plurality of first speakers 1 disposed equidistantly on the first circumference 16 which is coaxial with the rotational axis 14 and are parallel to the rotor blade plane 15, at a position opposed to one surface 15A of the rotor blade plane 15 defined by the rotor blades 13 rotating about the rotational axis 14, the first speakers 1 including one standard first speaker 1_1; a plurality of second speakers 2 disposed equidistantly on the second circumference 17 which is coaxial with the rotational axis 14, are parallel to the rotor blade plane 15 and has the same diameter as the first circumference 16, at a position opposed to the other surface 15B of the rotor blade plane 15, the number of second speakers 2 being the same as the number of first speakers 1, and the second speakers 2 including one standard second speaker 2_1; at least one evaluation microphone m which acquires noise generated from the rotating rotor blades 13 and control sound generated from the first speakers 1 and second speakers 2; and an active sound suppression processor 21 which generates a control signal, generates for the respective first speakers 1 first delay control signals obtained by delaying the control signal by a predetermined time in accordance with a displacement amount of an azimuth angle relative to an azimuth angle of the standard first speaker 1_1, inputs to the first speakers 1 the first delay control signals corresponding to the first speakers 1, generates for the respective second speakers 2 second delay control signals obtained by delaying the control signal by a predetermined time in accordance with a displacement amount of an azimuth angle relative to an azimuth angle of the standard second speaker 2_1, and inputs to the second speakers 2 the second delay control signals corresponding to the second speakers 2.

In addition, the noise reduction system 11' includes a plurality of first speakers 1 disposed equidistantly on the first circumference 16 which is opposed to one surface 15A of the rotor blade plane 15; a plurality of second speakers 2 disposed equidistantly on the second circumference 17 which is opposed to the other surface 15B of the rotor blade plane 15; at least one evaluation microphone m which acquires noise generated from rotating rotor blades 13 and control sound generated from the first speakers 1 and second speakers 2; and an active sound suppression processor 21 which inputs to the first speakers 1 first delay control signals corresponding to the first speakers 1, and inputs to the second speakers 2 second delay control signals corresponding to the second speakers 2.

According to these configurations, the acoustic power due to noise can effectively be suppressed by the double-ring configurations composed by the first speakers 1 and second speakers 2.

The distance from the rotor blade plane 15 to the first circumference 16 is equal to the distance from the rotor blade plane 15 to the second circumference 17. According to this configuration, the first speakers 1 and second speakers 2 can be disposed symmetric with respect to the rotor blade plane 15. Thereby, the rotor blade noise reduction system 11, which can effectively suppress acoustic power due to noise, can be provided.

The azimuth angles of the respective second speakers are identical to the azimuth angles of the respective first speakers, and the respective first delay control signals are identical to the respective second delay control signals. According to this configuration, the number of control signals can be reduced, and the number of speaker amplifiers in the active sound suppression processor 21 can be reduced.

The distance h from the rotor blade plane 15 to the first circumference 16 can be calculated as the value which maximizes the evaluation function J. According to this configuration, the value of the optimal h can easily be calculated by the evaluation function J, and no trial-and-error is needed for examining the optimal h.

The number of evaluation microphones m is one, and the elevation angle θ of the evaluation microphone m is calculated as the value which minimizes $J_2$ of the evaluation function. According to this configuration, the value of the optimal θ can easily calculated by the evaluation function $J_2$, and no trial-and-error is needed for examining the optimal θ.

The number of evaluation microphones m is plural, and the evaluation microphones m are disposed on the third circumference 23 which is coaxial with the rotational axis 14 and is parallel to the rotor blade plane 15. The elevation angle θ of the evaluation microphone m is calculated as the value which minimizes the evaluation function $J_3$. According to this configuration, the value of the optimal θ can easily be calculated by the evaluation function $J_3$, and no trial-and-error is needed for examining the optimal θ.

In a second embodiment and a third embodiment below, different parts from the above-described first embodiment and Examples 1 to 6 of the first embodiment will mainly be described, and illustrations and descriptions of common parts will be omitted.

Second Embodiment

The present embodiment is common to the above-described embodiment in that the rotor blade noise reduction system 11 (noise reduction system 11') has the double-ring configuration of speakers. However, the present embodiment differs from the first embodiment with respect to the azimuth angles of the second speakers 2 disposed on the second circumference 17, and the second delay control signals u1 to uLc which are input to the second speakers 2. The rotor blade noise reduction system 11 is installed, for example, near the axial-flow fan or propeller of the flying object 12.

Figure 25:
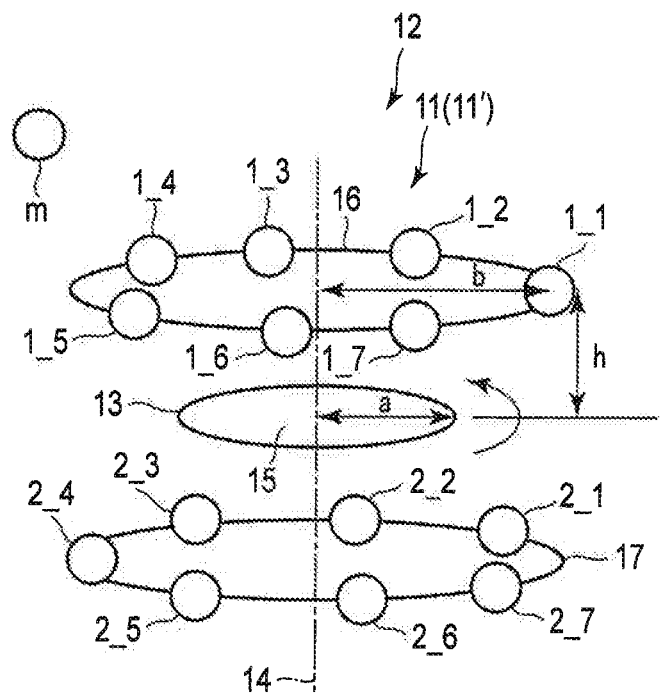
FIG. 25 is a perspective view illustrating a rotor blade noise reduction system of a second embodiment.

In the present embodiment, as illustrated in FIG. 25, the azimuth angles (azimuth angles as viewed from the rotational axis) of the respective second speakers 2 are displaced from the azimuth angles of the respective first speakers 1. Concretely, the second speakers 2 are arranged in such an interlaced structure that the second speaker 2 is located between the first speakers 1.

To be more specific, it is assumed that, on the first circumference 16, a first speaker, which has an azimuth angle displaced by a predetermined angle in the same direction as the rotational direction of the rotor blade from the azimuth angle of the standard first speaker 1_1, is a first speaker 1_2, and a first speaker, which has an azimuth angle displaced by a predetermined angle in the same direction as the rotational direction (indicated by an arrow in FIG. 25) of the rotor blade 13 from the azimuth angle of the first speaker 1_2, is a first speaker 1_3. Similarly, it is assumed that the following first speakers are a first speaker 1_4, a first speaker 1_5, a first speaker 1_6, and a first speaker 1_7.

It is assumed that, on the second circumference 17, a second speaker, which has an azimuth angle displaced by a predetermined angle in the same direction as the rotational direction of the rotor blade 13 from the azimuth angle of the standard second speaker 2_1, is a second speaker 2_2, and a second speaker, which has an azimuth angle displaced by a predetermined angle in the same direction as the rotational direction of the rotor blade 13 from the azimuth angle of the second speaker 2_2, is a second speaker 2_3. Similarly, it is assumed that the following second speakers are a second speaker 2_4, a second speaker 2_5, a second speaker 2_6, and a second speaker 2_7.

Furthermore, each second speaker 2 included in the plural second speakers 2 is disposed at an azimuth angle at a substantially middle position between a first speaker 1 which is included in the plural first speakers 1 and corresponds to this second speaker 2, and another first speaker 1 neighboring this first speaker 1. For example, the standard second speaker 2_1 is disposed at an azimuth angle at a substantially middle position between the standard first speaker 1_1 which corresponds to the standard second speaker 2_1, and the first speaker 1_2 which is another first speaker neighboring the standard first speaker 1_1. Similarly, the second speaker 2_2 is disposed at an azimuth angle at a substantially middle position between the first speaker 1_2 which corresponds to the second speaker 2_2, and the first speaker 1_3 which is another first speaker neighboring the first speaker 1_2. The same applies to the other second speakers 2-3 to 2-7.

Figure 26:
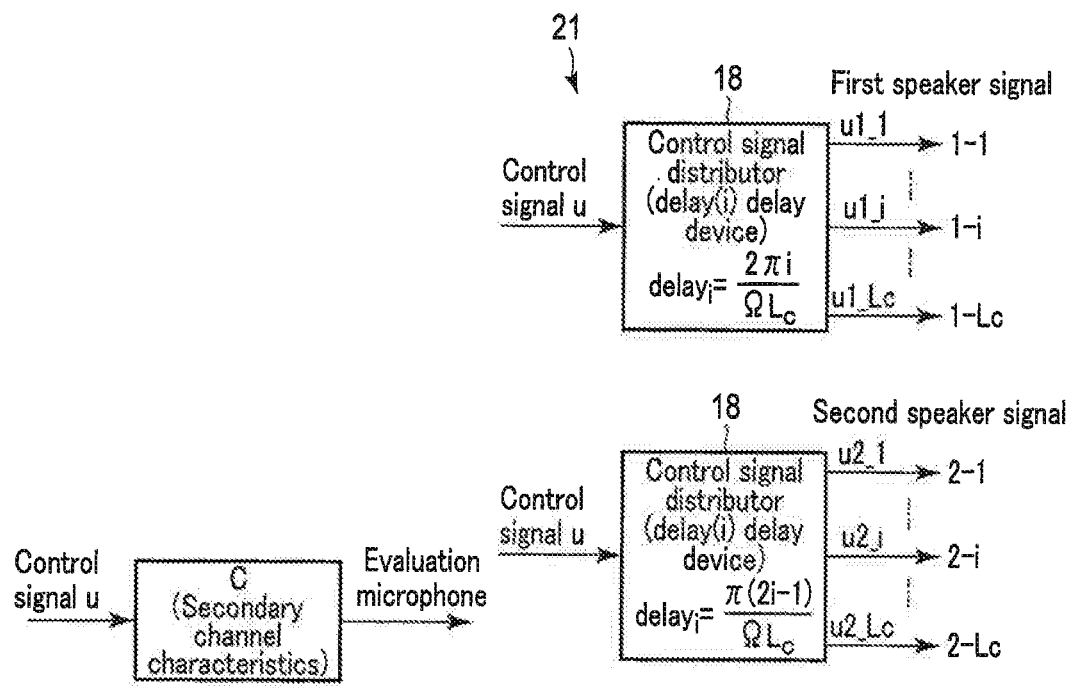
FIG. 26 is a block diagram illustrating a distribution method of control signals with use of distributors/delay devices of the rotor blade noise reduction system of the second embodiment.

Unlike Examples 1-6 of the first embodiment, the azimuth angles of the respective second speakers 2 are displaced from the azimuth angles of the respective first speakers 1. Thus, signals, which are different from the signals input to the first speakers 1, are input to the second speakers 2. As illustrated in FIG. 26, in the first speakers 1 on the first circumference 16, a proper delay amount expressed below is applied to the control signal u by the distributor/delay device 18.

$$\text{delay}_i = \frac{2\pi i}{\Omega L_c}$$

In the second speakers 2 on the second circumference 17, a proper delay amount expressed below is applied.

$$\text{delay}_i = \frac{\pi(2i-1)}{\Omega L_c}$$

Here, $\Omega$ is the rotor blade rotation angular velocity, Lc is the total number of first speakers 1 or the total number of second speakers 2, and i is the microphone number. Accordingly, in the present embodiment, the respective second delay control signals u1 to uLc are different from the first delay control signals u1 to uLc.

Example 7

Figure 27:
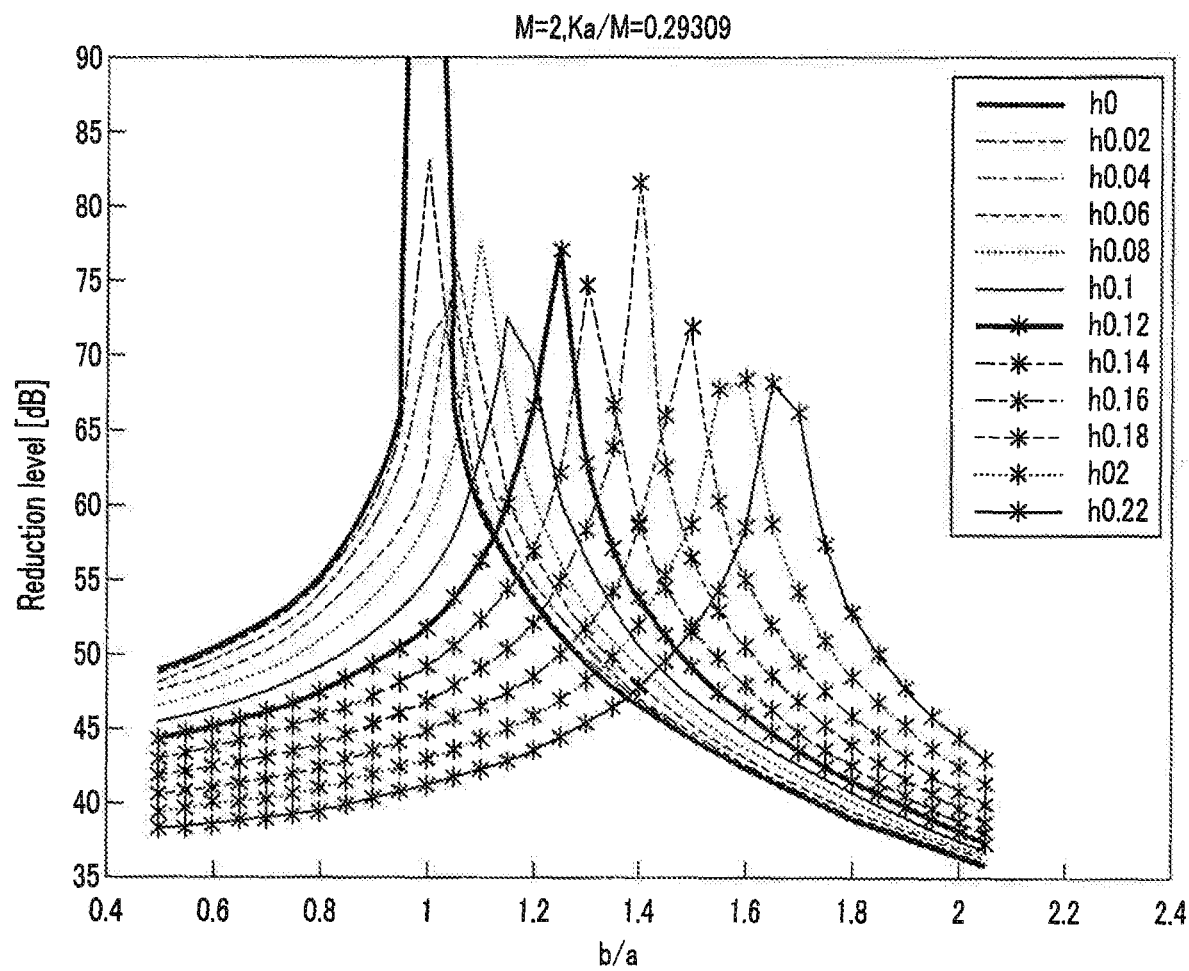
FIG. 27 is a graph illustrating a reduction level of acoustic power of Example 7 of the second embodiment.

Under the same conditions as the conditions of Example 1, only the arrangement of the first speakers 1 and second speakers 2 is changed from Example 1, and the above-described interlaced structure is adopted. The total number of first speakers 1 is seven, and the total number of second speakers 2 is seven. The result is illustrated in FIG. 27. From the result of FIG. 27, it is understood that the reduction effect of acoustic power is improved, compared to FIG. 7 of Example 1. Note that in Example 7, in order to evaluate the basic performance of the rotor blade reduction system 11 (the double-ring configuration having the interlaced structure), the evaluation microphone m is not used, and the reduction level [dB] of acoustic power at a time of optimal control is illustrated.

Example 8

The same conditions as the conditions of Example 1 were adopted. In addition, only the arrangement of the first speakers 1 and second speakers 2 was changed from Example 1, and the above-described interlaced structure was adopted. Moreover, in this Example, the total number of first speakers 1 and the total number of second speakers 2 are reduced. The total number of first speakers 1 is six, and the total number of second speakers 2 is six. The result is illustrated in FIG. 28. In this Example, the same reduction effect of acoustic power as the effect illustrated in FIG. 7 of Example 1 can be exhibited. Therefore, according to the present Example, by adopting the interlaced structure, the number of speakers used can be decreased, compared to Example 1.

In the above, the second embodiment and Examples 7 and 8 were described. According to these, the following can be said. The azimuth angle of each of the second speakers 2 is displaced from the azimuth angle of each of the first speakers 1. Each second speaker 2 included in the plural second speakers 2 is disposed at an azimuth angle at a substantially middle position between a first speaker 1 which is included in the plural first speakers 1 and corresponds to this second speaker 2, and another first speaker 1 neighboring this first speaker 1 and included in the plural first speakers 1.

According to this configuration, a so-called interlaced structure, in which the second speaker 2 is disposed between the first speakers 1, can be realized, and thereby the reduction effect of acoustic power of noise can be improved. Moreover, by improving the reduction effect of acoustic power, the number of necessary speakers can be reduced, and the necessary cost for installing the rotor blade noise reduction system 11 can be reduced.

Third Embodiment

A rotor blade noise reduction system 11 (noise reduction system 11') of the present embodiment differs from the first embodiment in that a ring-shaped flat plate is provided on the rotor blade plane 15, and that the second speakers 2 are omitted. The rotor blade noise reduction system 11 of the present embodiment, is installed, for example, near the axial-flow fan or propeller of the flying object 12.

Figure 29:
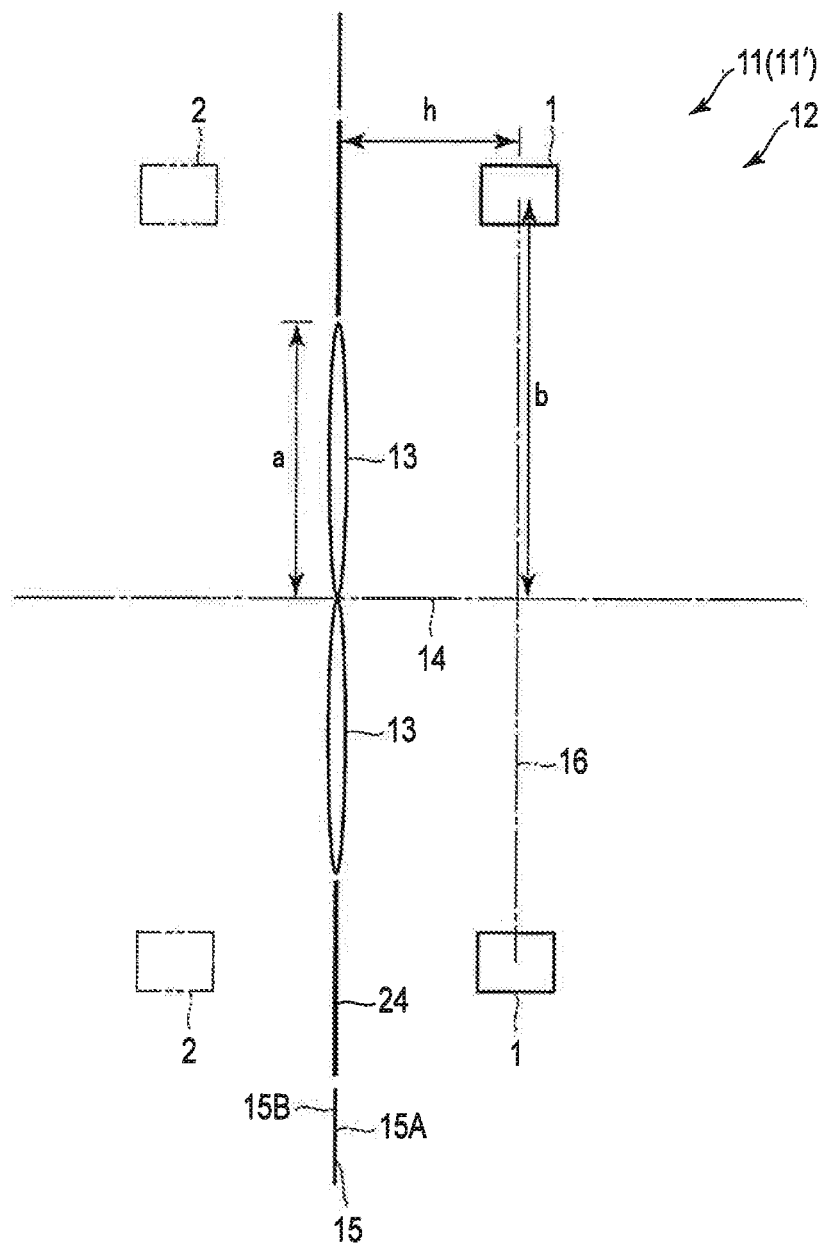
FIG. 29 is a perspective view illustrating a rotor blade noise reduction system of a third embodiment.

As illustrated in FIG. 29, in this embodiment, a ring-shaped flat plate 24 is provided on the rotor blade plane 15 around the rotor blades 13. The ring-shaped flat plate 24 is provided at a position neighboring the rotor blades 13 on the rotor blade plane 15. The ring-shaped flat plate 24 is provided in a so-called baffleplate shape in a manner to surround the rotor blades 13. The material of the ring-shaped flat plate 24 may be discretely chosen, and the ring-shaped flat plate 24 may be formed of, for example, an iron plate or the like. The ring-shaped flat plate 24 can reflect control sound (acoustic wave) from the first speakers 1. On the other hand, in the present embodiment, the second speakers 2 are omitted. Thus, in this embodiment, a sound source of a mirror image (sound source of control sound) can be formed by the ring-shaped flat plate 24, and a virtual double-ring configuration is realized. It was confirmed that the same reduction effect of acoustic power as in the first embodiment and Example 1 can be obtained by the present embodiment, too.

According to the present embodiment, the following can be said. The rotor blade noise reduction system 11 includes the ring-shaped flat plate 24 which is provided at the position neighboring the rotor blades 13 on the rotor blade plane 15, and which can reflect control sound from the first speakers 1, and the second speakers 2 are omitted. According to this configuration, the so-called double-ring configuration can be realized by half the number of speakers, and the necessary cost for installing the rotor blade noise reduction system 11 can remarkably be reduced.

While certain embodiments have been described, these embodiments have been presented by way of example only, and are not intended to limit the scope of the embodiments. Indeed, the embodiments described herein may be embodied in a variety of other forms; furthermore, various omissions, substitutions and changes in the form of the embodiments described herein may be made without departing from the spirit of the invention. The cases in which the rotor blade noise reduction systems 11 of the embodiments were applied to the axial-flow fan or propeller of the flying object were described by way of example. However, the axial-flow fan, to which the rotor blade noise reduction systems 11 are applied, is not limited to this. Needless to say, the rotor blade noise reduction systems 11 of the embodiments are applicable to, for example, turbo fans, industrial fans (jet engines, etc.), fans used in moving objects other than the flying object, and other general fans. The accompanying claims and their equivalents are intended to cover such forms ore modifications as would fall within the scope and spirit of the inventions.

The invention claimed is:

1. A rotor blade noise reduction system comprising:
a plurality of rotor blades configured to be rotatable about a rotational axis;
a plurality of first speakers disposed equidistantly on a first circumference which is opposed to one surface of a rotor blade plane defined by the rotor blades rotating about the rotational axis;
a plurality of second speakers disposed equidistantly on a second circumference which is opposed to the other surface of the rotor blade plane;
at least one evaluation microphone configured to acquire noise generated from the rotating rotor blades and control sound generated from the first speakers and the second speakers; and
an active sound suppression processor configured to input a plurality of first delay control signals corresponding to the first speakers, and to input a plurality of second delay control signals corresponding to the second speakers.

2. The rotor blade noise reduction system of claim 1, wherein a distance from the rotor blade plane to the first circumference is equal to a distance from the rotor blade plane to the second circumference.

3. The rotor blade noise reduction system of claim 1, wherein the first speakers include one standard first speaker, the second speakers include one standard second speaker, the active sound suppression processor is configured to generate a control signal, to generate for the respective first speakers the first delay control signals obtained by delaying the control signal by a predetermined time in accordance with a displacement amount of an azimuth angle relative to an azimuth angle of the standard first speaker, and to generate for the respective second speakers the second delay control signals obtained by delaying the control signal by a predetermined time in accordance with a displacement amount of an azimuth angle relative to an azimuth angle of the standard second speaker,
azimuth angles of the respective second speakers are identical to azimuth angles of the respective first speakers, and
the respective first delay control signals are identical to the respective second delay control signals.

4. The rotor blade noise reduction system of claim 1, wherein the first speakers include one standard first speaker, the second speakers include one standard second speaker, the active sound suppression processor is configured to generate a control signal, to generate for the respective first speakers the first delay control signals obtained by delaying the control signal by a predetermined time in accordance with a displacement amount of an azimuth angle relative to an azimuth angle of the standard first speaker, and to generate for the respective second speakers the second delay control signals obtained by delaying the control signal by a predetermined time in accordance with a displacement amount of an azimuth angle relative to an azimuth angle of the standard second speaker,
azimuth angles of the respective second speakers are displaced from azimuth angles of the respective first speakers, and
each second speaker included in the second speakers is disposed at an azimuth angle at a substantially middle position between one first speaker which is included in the first speakers and corresponds to the second speaker, and another first speaker neighboring the one first speaker and included in the first speakers.

5. The rotor blade noise reduction system of claim 1, wherein a distance h from the rotor blade plane to the first circumference is calculated as a value which maximizes J below, $$J = -10\log 10\left(\text{Re}\left\{-\frac{2BC}{(A+E)D} + 1\right\}\right), \text{ where}$$

$$A = \sum_{i=1}^{Lc}\sum_{j=1}^{Lc}\beta_i\beta_j^*\text{sinc}(kd_{s1_i s1_j}),$$

$$B = \sum_{i=1}^{Lc}\sum_{j=1}^{Lp}\beta_i\alpha_j^*\text{sinc}(kd_{s1_i p_j}),$$

-continued $$C = \sum_{i=1}^{Lp} \sum_{j=1}^{Lc} \alpha_i \beta_j^* \text{sinc}(kd_{p_i s1_j}),$$

$$D = \sum_{i=1}^{Lp} \sum_{j=1}^{Lp} \alpha_i \alpha_j^* \text{sinc}(kd_{p_i p_j}),$$

$$E = \sum_{i=1}^{Lc} \sum_{j=1}^{Lc} \beta_i \beta_j^* \text{sinc}(kd_{s1_i s2_j}),$$

$$\alpha_i = \exp\left(-jM\frac{2\pi i}{L_p}\right),$$

$$\beta_i = \exp\left(-jM\frac{2\pi i}{L_c}\right),$$

wherein $L_p$ is a number of sound sources, $L_c$ is a number of the speakers, k is a wave number, d is a distance between two points, M=Bx, B is a number of the rotor blades, and x is an order.

6. The rotor blade noise reduction system of claim 1, wherein a number of the evaluation microphones is one, an elevation angle θ of the evaluation microphone is calculated as a value which minimizes $J_2$ below, $$J_2 = \left| \frac{X}{Y+Z} - \frac{C}{A+E} \right|, \text{ where}$$

$$X = \sum_i^{Lp} \alpha_i e^{-jkr_{pi}} / r_{pi},$$

$$Y = \sum_i^{Lc} \beta_i e^{-jkr_{s1i}} / r_{s1i},$$

$$Z = \sum_i^{Lc} \beta_i e^{-jkr_{s2i}} / r_{s2i},$$

$$A = \sum_{i=1}^{Lc} \sum_{j=1}^{Lc} \beta_i \beta_j^* \text{sinc}(kd_{s1_i s1_j}),$$

$$C = \sum_{i=1}^{Lp} \sum_{j=1}^{Lc} \alpha_i \beta_j^* \text{sinc}(kd_{p_i s1_j}),$$

$$E = \sum_{i=1}^{Lc} \sum_{j=1}^{Lc} \beta_i \beta_j^* \text{sinc}(kd_{s1_i s2_j}),$$

$$\alpha_i = \exp\left(-jM\frac{2\pi i}{L_p}\right),$$

$$\beta_i = \exp\left(-jM\frac{2\pi i}{L_c}\right),$$

wherein $r_{pi}$ is a distance from the evaluation microphone to an i-th sound source, $r_{s1i}$ is a distance from the evaluation microphone to the first speaker that is an i-th first speaker, $r_{s2i}$ is a distance from the evaluation microphone to the second speaker that is an i-th second speaker, $L_p$ is a number of sound sources, $L_c$ is a number of the first speakers and the second speakers, k is a wave number, d is a distance between two points, M=Bx, B is a number of the rotor blades, and x is an order.

7. The rotor blade noise reduction system of claim 1, wherein a number of the evaluation microphones is one, an elevation angle θ of the evaluation microphone is calculated as a value which minimizes $J_{2b}$ below, $$J_{2b}(\theta_m) = \sum_{\theta=0}^{\pi/2} \{T(a, r_t, \theta, \phi_t) - k(\theta_m) \times T(b, r_t, \theta, \phi_t)\} \text{ where}$$

$$T(a, lm, \theta_m, \phi_m) = \sum_{i=1}^{Lp} \{(1/(4\pi r_{pi})) \times e^{-jkr_{pi}} \alpha_i\},$$

$$T(b, lm, \theta_m, \phi_m) = \sum_{i=1}^{Lc} \{(1/(4\pi r_{s1i})) \times e^{-jkr_{s1i}} \beta_i\} + \sum_{i=1}^{Lc} \{(1/(4\pi r_{s2i})) \times e^{-jkr_{s2i}} \beta_i\},$$

$$T(a, lm, \theta_m, \phi_m) = k(\theta_m) \times T(b, lm, \theta_m, \phi_m),$$

$$\alpha_i = \exp\left(-jM\frac{2\pi i}{L_p}\right),$$

$$\beta_i = \exp\left(-jM\frac{2\pi i}{L_c}\right)$$

wherein r is a distance between two points, $L_p$ is a number of sound sources, $L_c$ is a number of the first speakers and the second speakers, k is a wave number, $r_t$ is an evaluation radius, and $\varphi_t$ is an evaluation azimuth angle.

8. The rotor blade noise reduction system of claim 1, wherein a number of the evaluation microphones is plural, and the evaluation microphones are disposed on a third circumference which is coaxial with the rotational axis and parallel to the rotor blade plane, an elevation angle θ of the evaluation microphone is calculated as a value which minimizes $J_3$ below, $$J_3 = \left| \frac{X'}{Y'+Z'} - \frac{C}{A+E} \right| \text{ where}$$

$$X' = \sum_i^{Lm} \left\{ \sum_j^{Lp} \alpha_j e^{-jkr_{pjmi}} / r_{pjmi} \right\} \gamma_i,$$

$$Y' = \sum_i^{Lm} \left\{ \sum_j^{Lc} \beta_j e^{-jkr_{s1jmi}} / r_{s1jmi} \right\} \gamma_i,$$

$$Z' = \sum_i^{Lm} \left\{ \sum_j^{Lc} \beta_j e^{-jkr_{s2jmi}} / r_{s2jmi} \right\} \gamma_i,$$

$$A = \sum_{i=1}^{Lc} \sum_{j=1}^{Lc} \beta_i \beta_j^* \text{sinc}(kd_{s1_i s1_j}),$$

$$C = \sum_{i=1}^{Lp} \sum_{j=1}^{Lc} \alpha_i \beta_j^* \text{sinc}(kd_{p_i s1_j}),$$

$$E = \sum_{i=1}^{Lc} \sum_{j=1}^{Lc} \beta_i \beta_j^* \text{sinc}(kd_{s1_i s2_j}),$$

$$\alpha_i = \exp\left(-jM\frac{2\pi i}{L_p}\right),$$

$$\beta_i = \exp\left(-jM\frac{2\pi i}{L_c}\right),$$

$$\gamma_i = \exp\left(jM\frac{2\pi i}{L_m}\right)$$

wherein r is a distance between two points, $L_p$ is a number of sound sources, $L_c$ is a number of the first speakers and the second speakers, $L_m$ is a number of the evaluation microphones, k is a wave number, d is a distance between two points, M=Bx, B is a number of the rotor blades, and x is an order.

9. The rotor blade noise reduction system of claim 1, wherein a number of the evaluation microphones is plural, and the evaluation microphones are disposed on a third circumference which is coaxial with the rotational axis and parallel to the rotor blade plane,
an elevation angle θ of the evaluation microphone is calculated as a value which minimizes $J_{2b}$ below, $$J_{2b}(\theta_m) = \sum_{\theta=0}^{\pi/2} \{T(a, r_t, \theta, \phi_t) - k(\theta_m) \times T(b, r_t, \theta, \theta_t)\} \text{ where}$$

$$T(a, lm, \theta_m, \phi_m) = \sum_{i=1}^{Lp} \{(1/(4\pi r_{pi})) \times e^{-jkr_{pi}} \alpha_i\},$$

$$T(a, lm, \theta_m, \phi_m) = k(\theta_m) \times T(b, lm, \theta_m, \phi_m),$$

$$\alpha_i = \exp\left(-jM\frac{2\pi i}{L_p}\right),$$

$$\beta_i = \exp\left(-jM\frac{2\pi i}{L_c}\right)$$

wherein r is a distance between two points, $L_p$ is a number of sound sources, k is a wave number, $r_t$ is an evaluation radius, $\phi_t$ is an evaluation azimuth angle, and $L_c$ is a number which is sufficiently greater than a number of the first speakers and the second speakers.

10. The rotor blade noise reduction system of claim 1, wherein a number of the evaluation microphones is plural, and the evaluation microphones are disposed on a third circumference which is coaxial with the rotational axis and parallel to the rotor blade plane,
an elevation angle θ of the evaluation microphone is calculated as a value which minimizes $J_{3b}$ below, $$J_{3b}(\theta_m) = \sum_{\theta=0}^{\pi/2} \{T(a, r_t, {}^i\theta, \phi_t) - k(\theta_m) \times T(b, r_t, \theta, \phi_t)\} \text{ where}$$

$$T(a, lm, \theta_m, \phi_m) = \sum_{i=1}^{Lm} \left\{\sum_{j=1}^{Lp} \{(1/(4\pi r_{pjmi})) \times e^{-jkr_{pjmi}} \alpha_i\}\gamma_i\right\},$$

$$T(b, lm, \theta_m, \phi_m) = \sum_{i=1}^{Lm} \left\{\sum_{j=1}^{Lc} \{(1/(4\pi r_{s1jmi})) \times e^{-jkr_{s1jmi}} \beta_i\}\gamma_i\right\} + \sum_{i=1}^{Lm} \left\{\sum_{j=1}^{Lc} \{(1/(4\pi r_{s2jmi})) \times e^{-jkr_{s2jmi}} \beta_i\}\gamma_i\right\},$$

$$T(a, lm, \theta_m, \phi_m) = k(\theta_m) \times T(b, lm, \theta_m, \phi_m),$$

$$\alpha_i = \exp\left(-jM\frac{2\pi i}{L_p}\right),$$

$$\beta_i = \exp\left(-jM\frac{2\pi i}{L_c}\right),$$

$$\gamma_i = \exp\left(jM\frac{2\pi i}{L_m}\right)$$

wherein r is a distance between two points, $L_p$ is a number of sound sources, $L_c$ is a number of the first speakers and the second speakers, k is a wave number, $r_t$ is an evaluation radius, and $\phi_t$ is an evaluation azimuth angle.

11. The rotor blade noise reduction system of claim 1, further comprising a ring-shaped flat plate provided at a position neighboring the rotor blades on the rotor blade plane, and configured to be capable of reflecting the control sound from the first speakers,
wherein the second speakers are omitted.

12. A flying object comprising the rotor blade noise reduction system of claim 1.

13. A noise reduction system comprising:
a plurality of first speakers disposed equidistantly on a first circumference which is opposed to one surface of a rotor blade plane;
a plurality of second speakers disposed equidistantly on a second circumference which is opposed to the other surface of the rotor blade plane;
at least one evaluation microphone configured to acquire noise generated from a plurality of rotor blades which rotate, and control sound generated from the first speakers and the second speakers; and
an active sound suppression processor configured to input to the first speakers a plurality of first delay control signals corresponding to the first speakers, and to input to the second speakers a plurality of second delay control signals corresponding to the second speakers.

* * * * *